July 9, 1963
J. W. ELDRED ETAL
3,096,709
DECORATING MACHINE
Filed Aug. 4, 1961
23 Sheets-Sheet 4
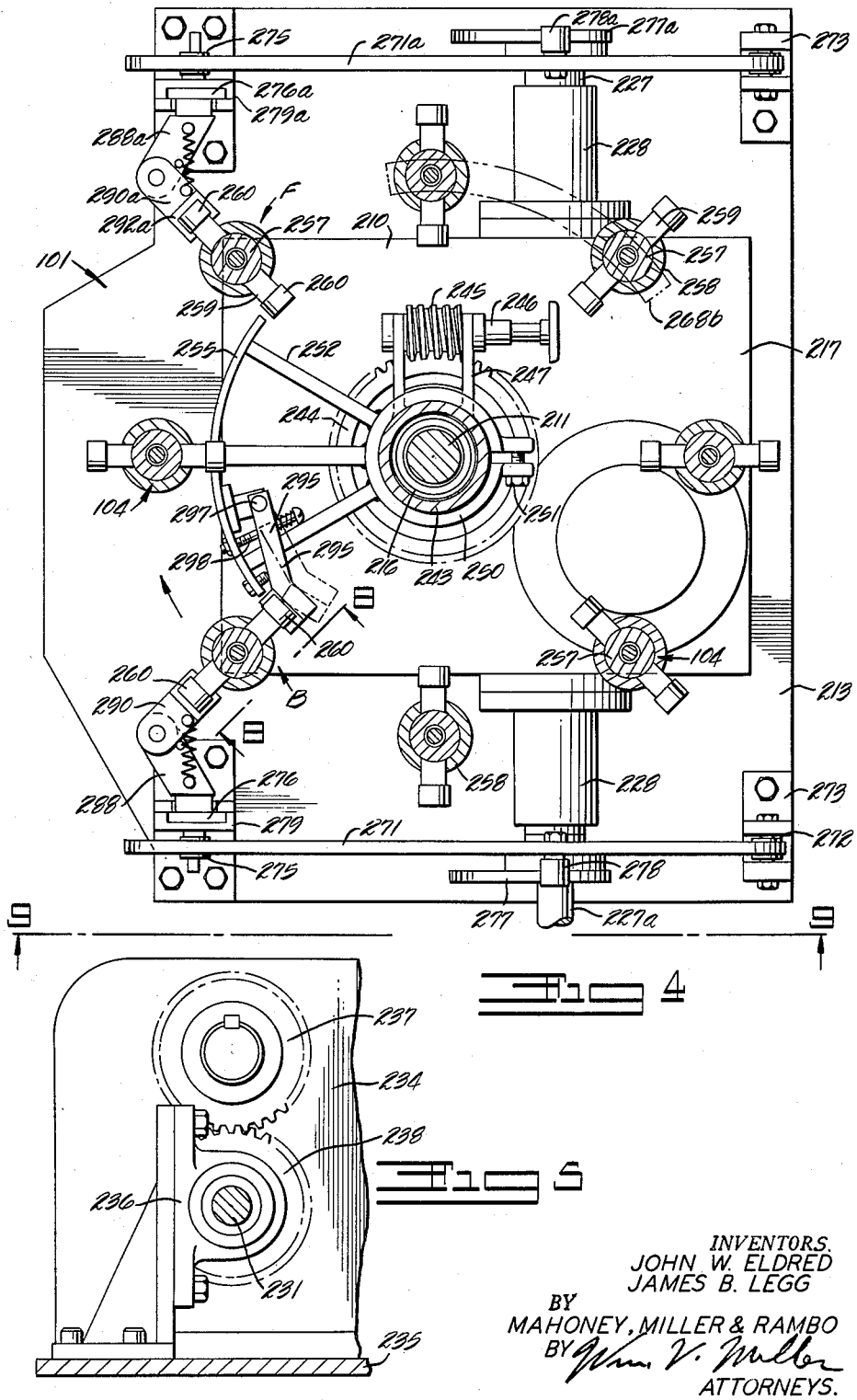
INVENTORS.
JOHN W. ELDRED
JAMES B. LEGG
BY
MAHONEY, MILLER & RAMBO
BY
ATTORNEYS.

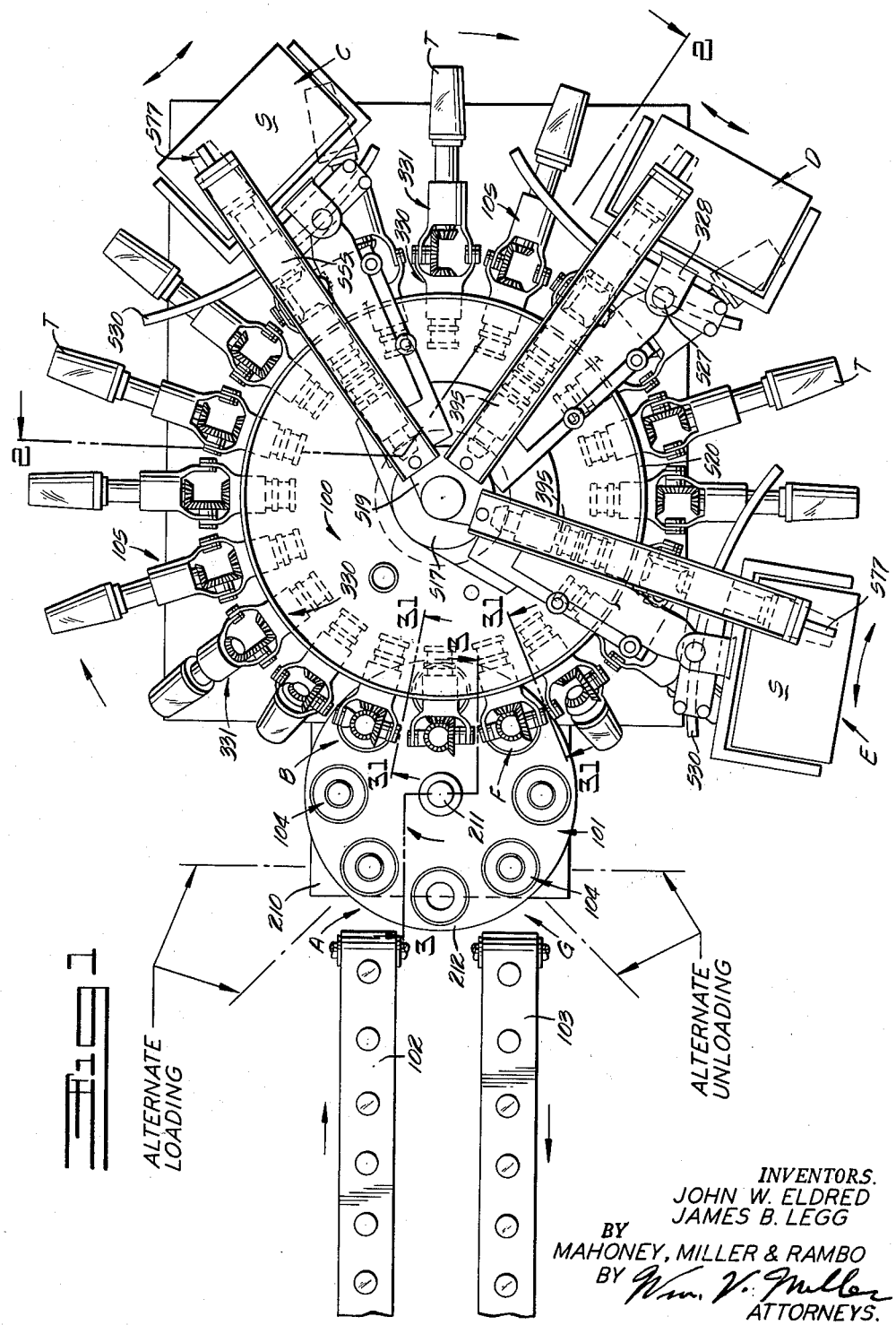

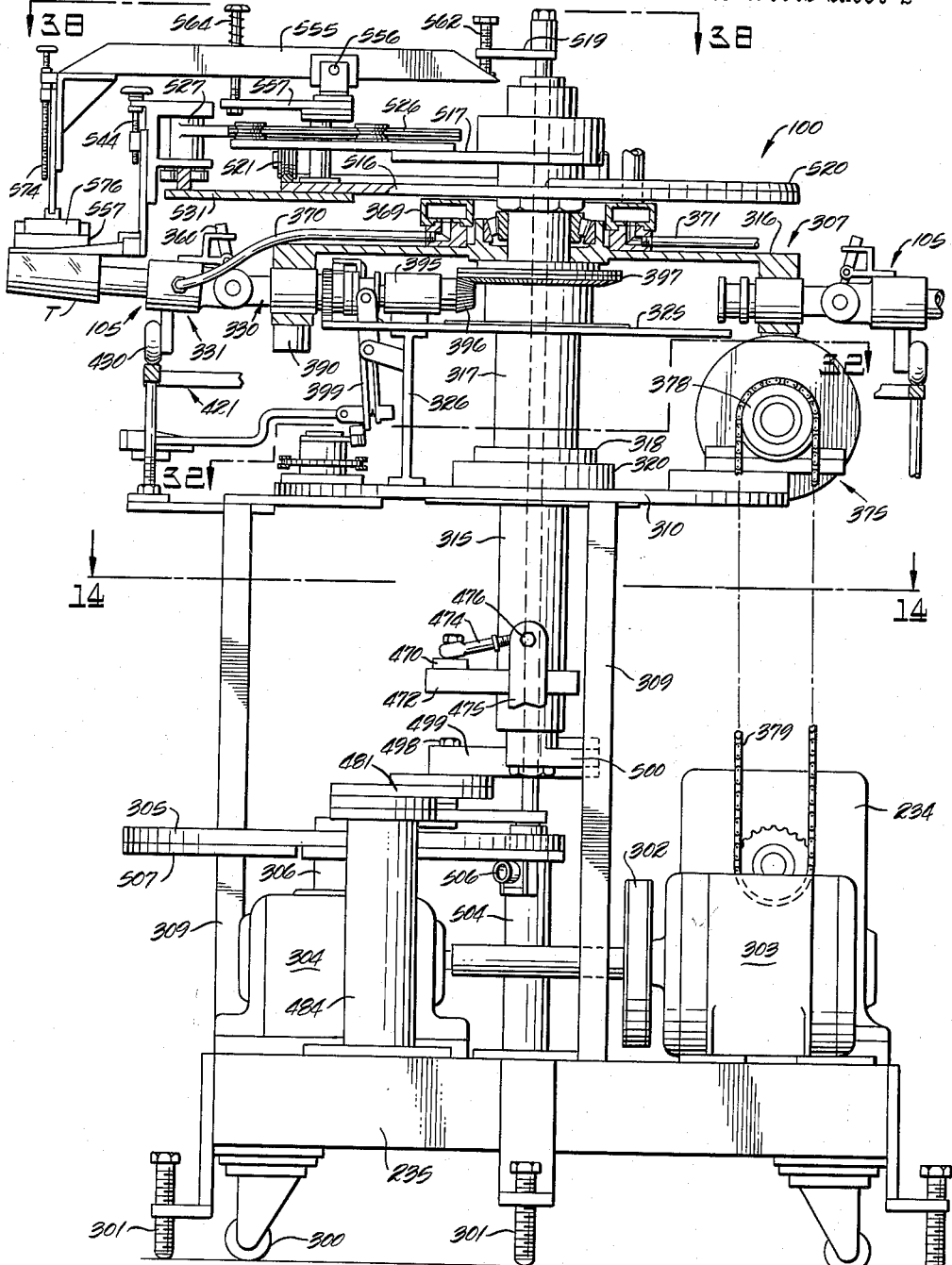

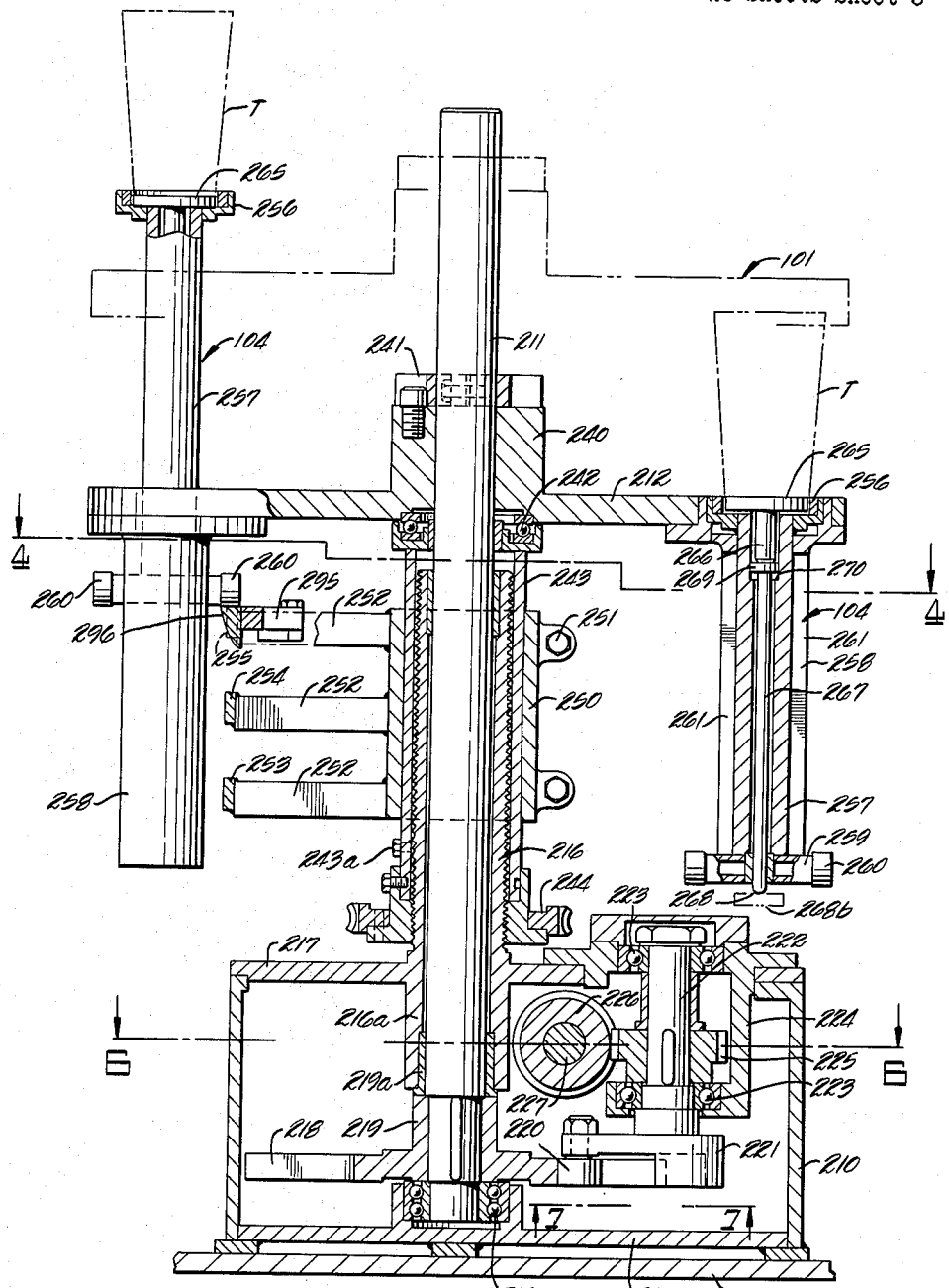

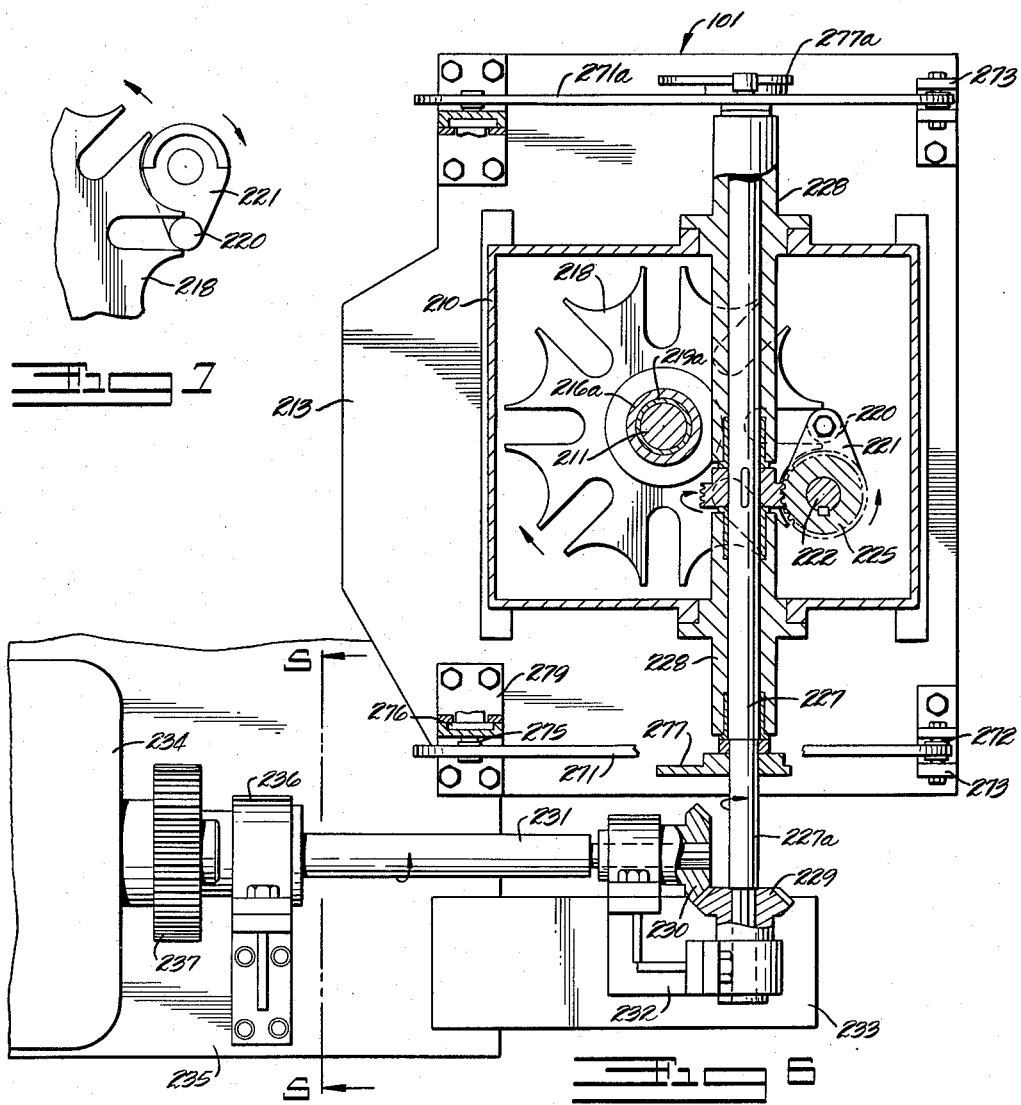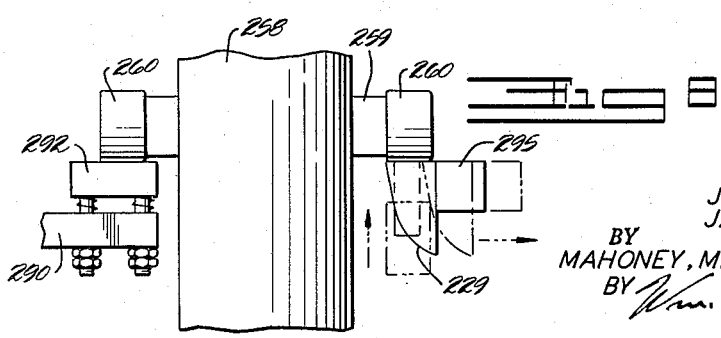

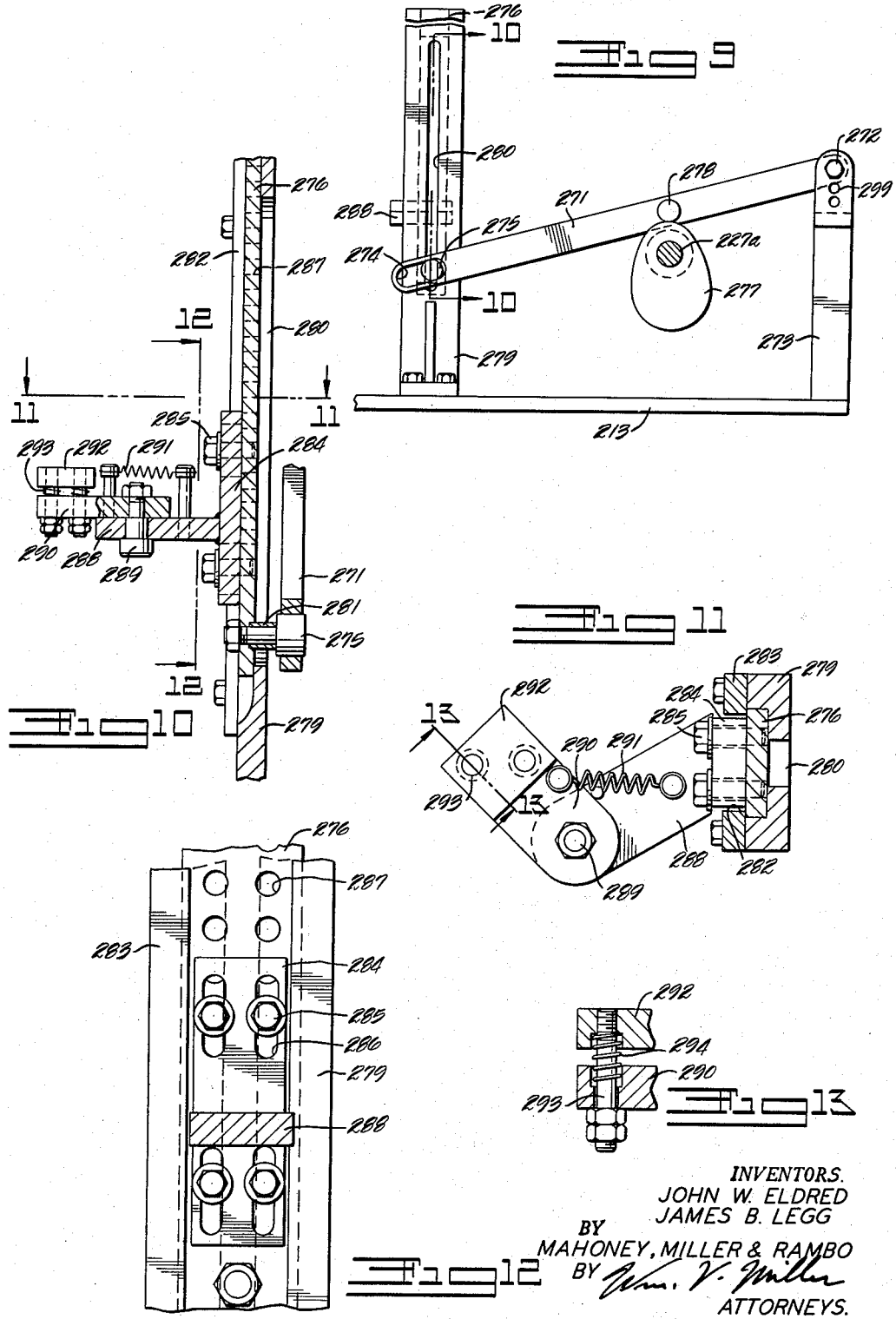

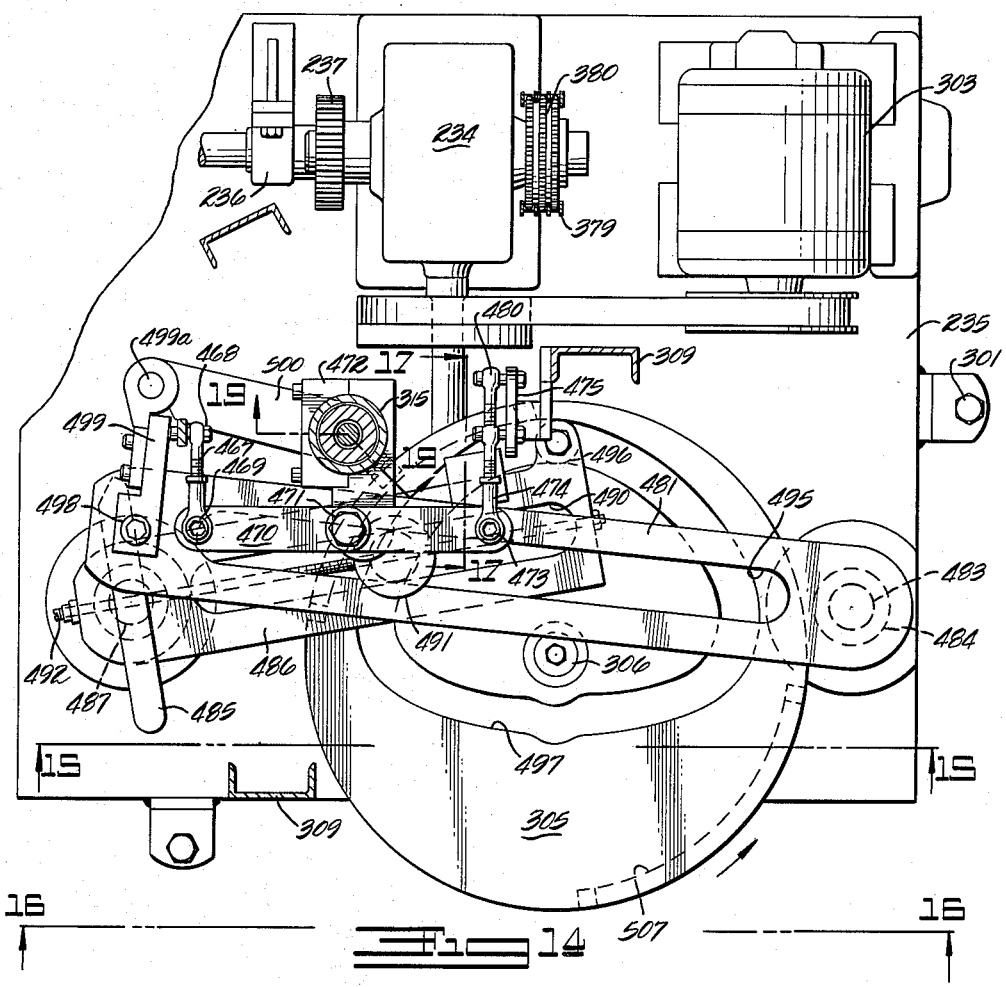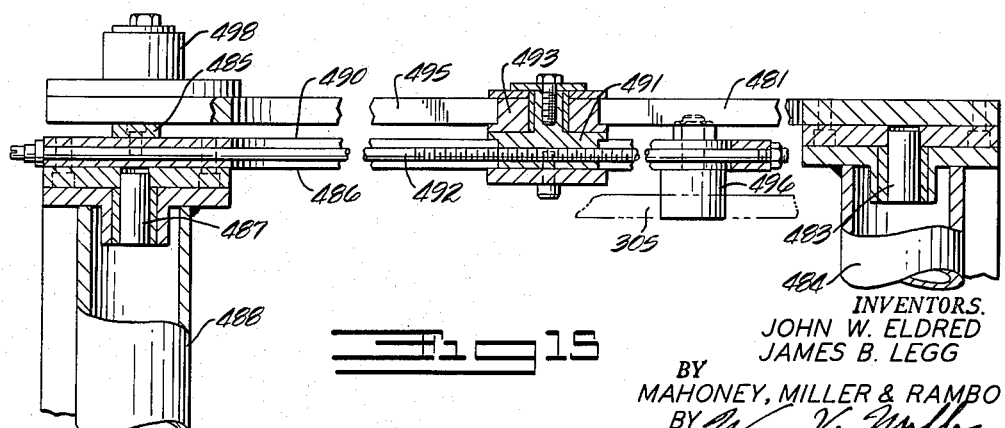

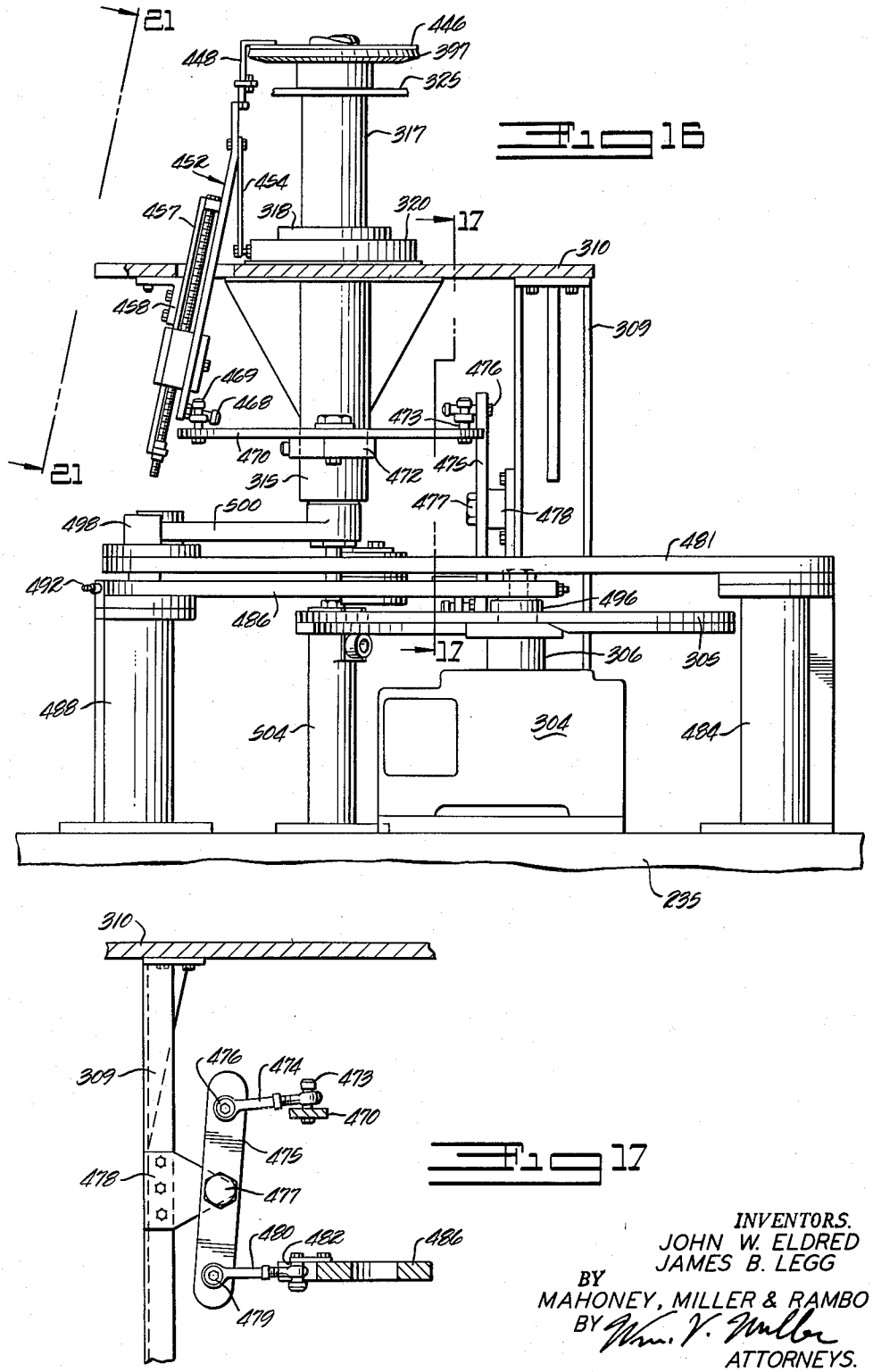

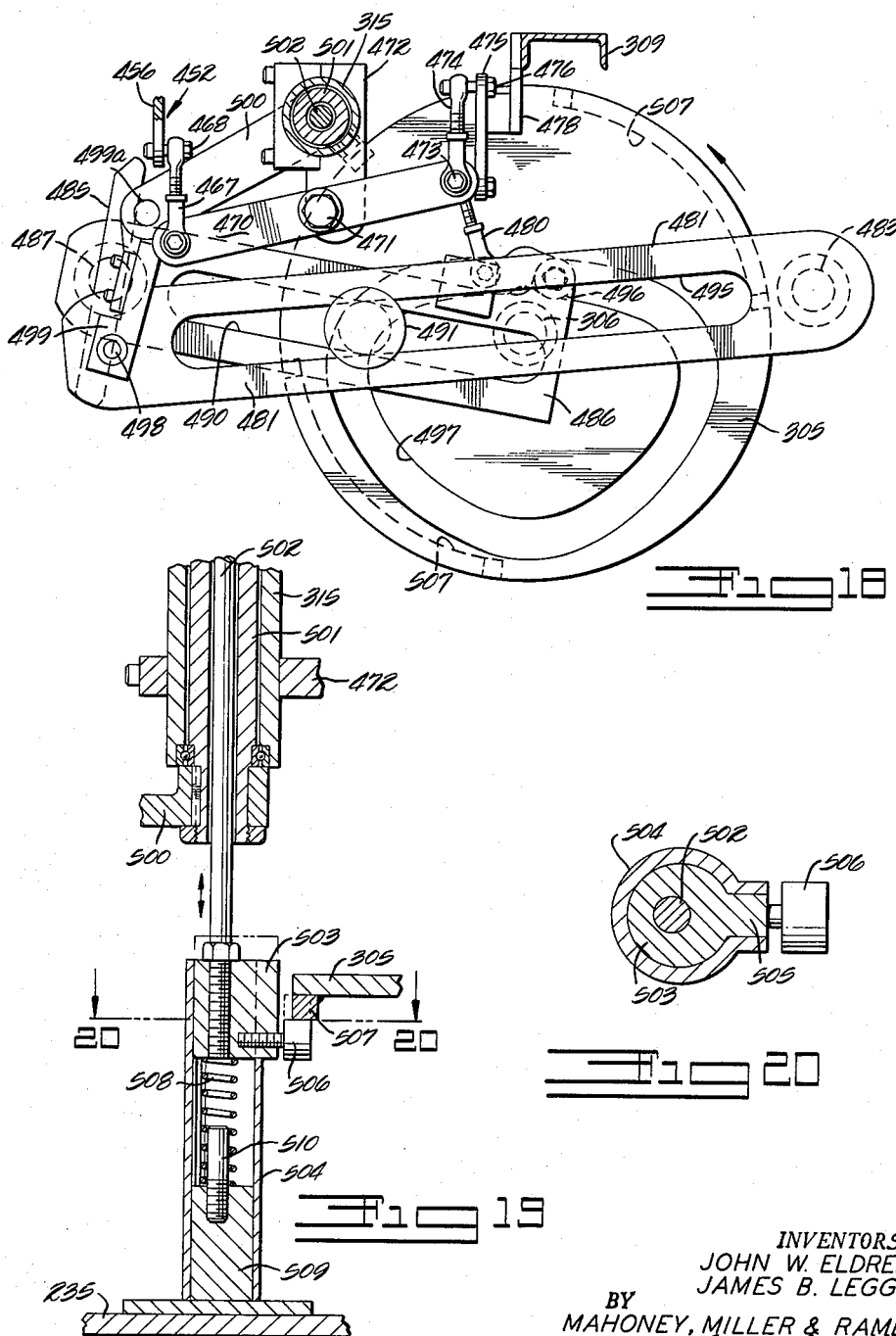

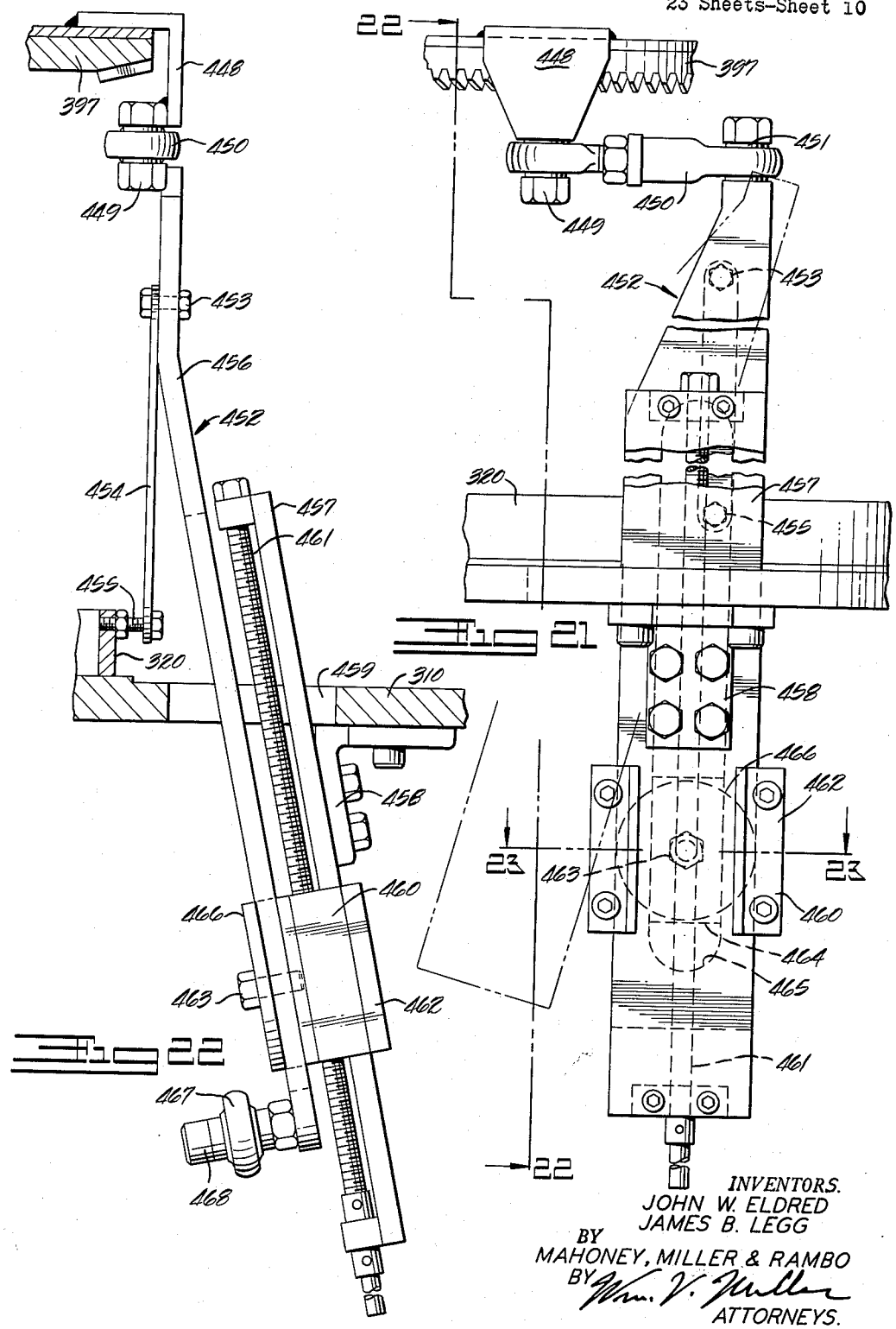

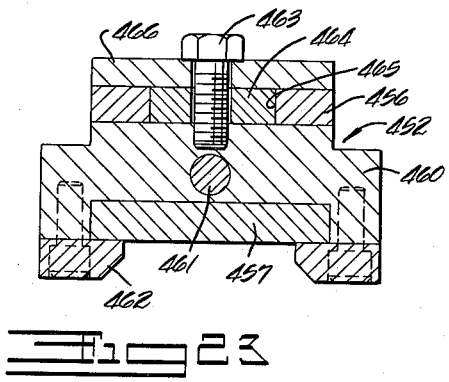
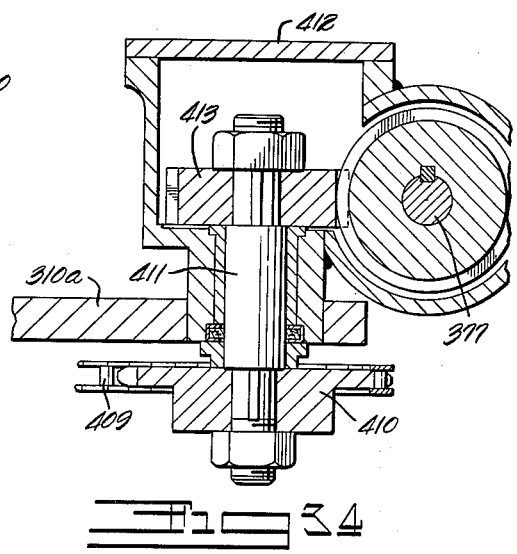
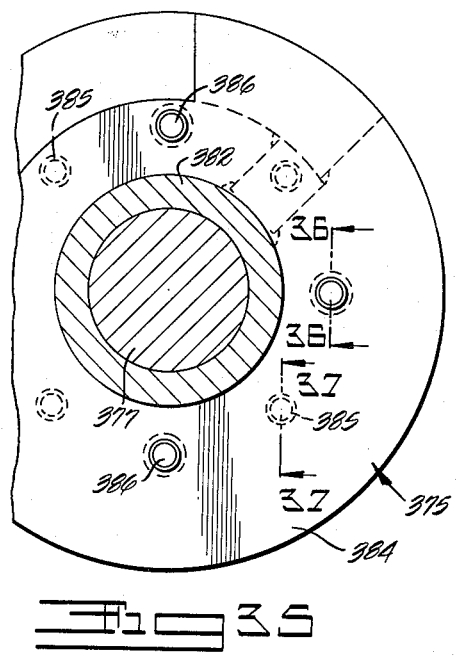
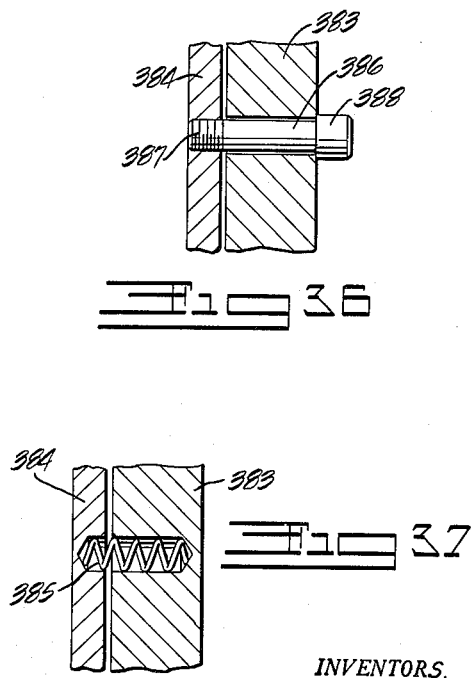

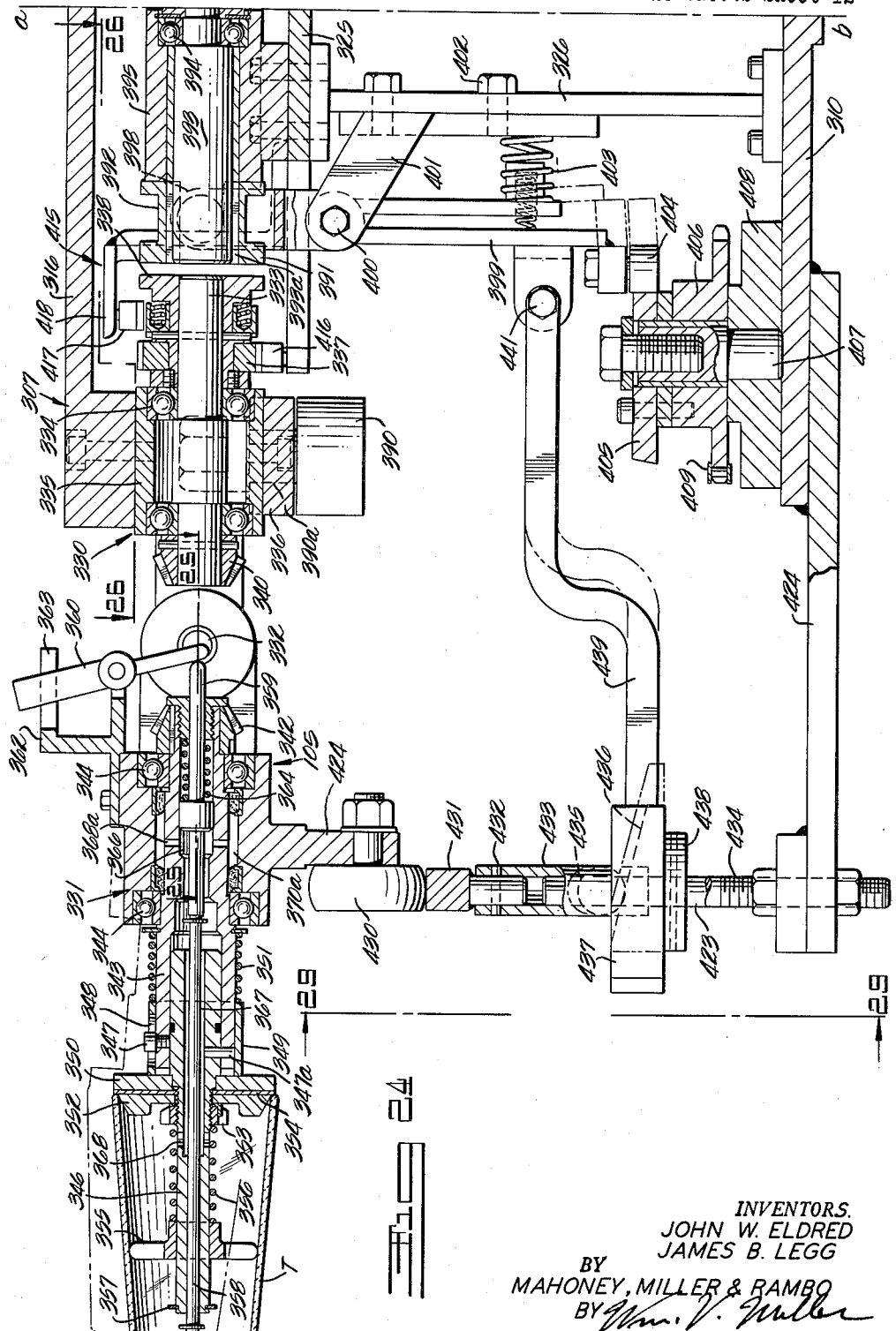

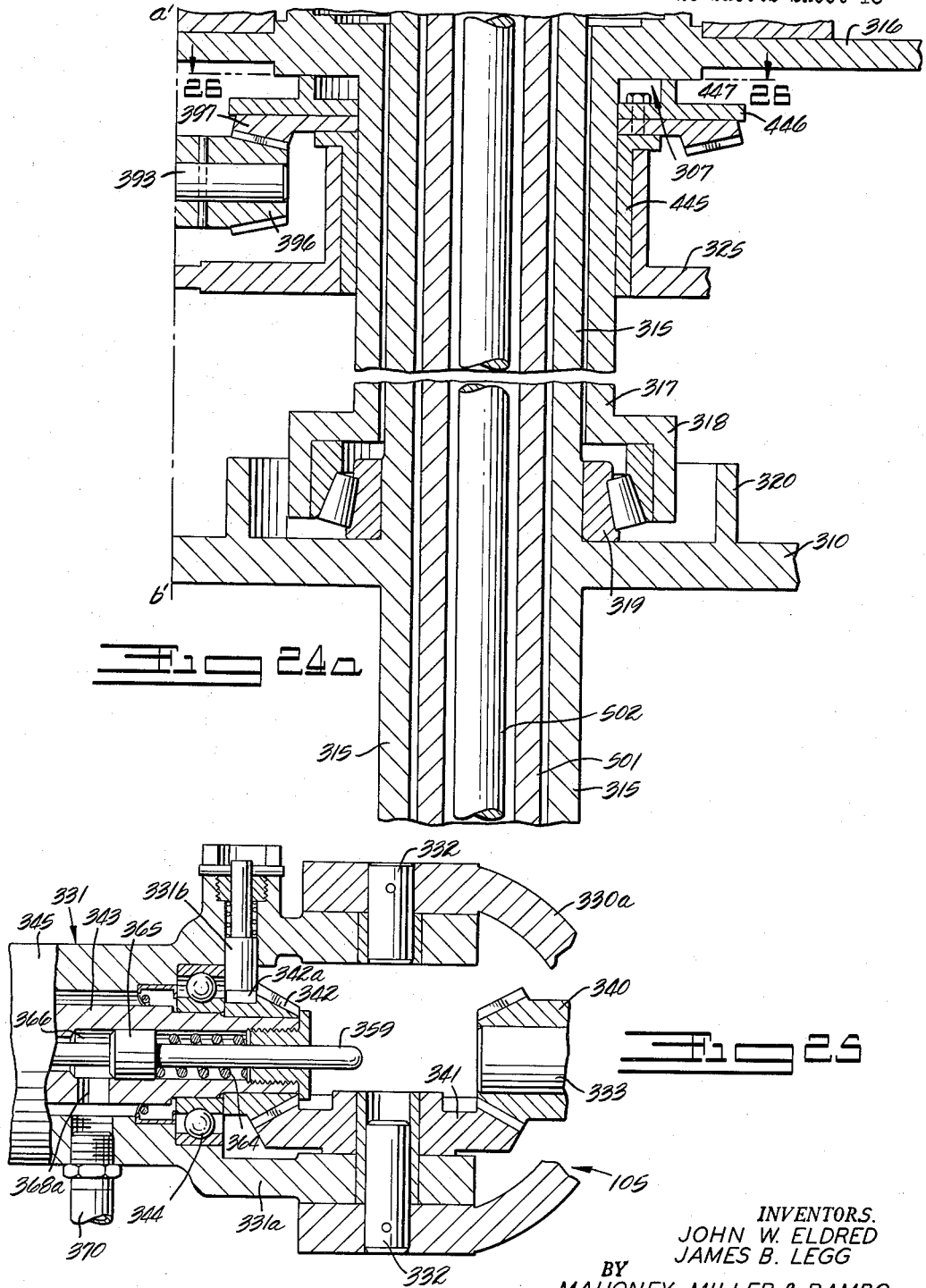

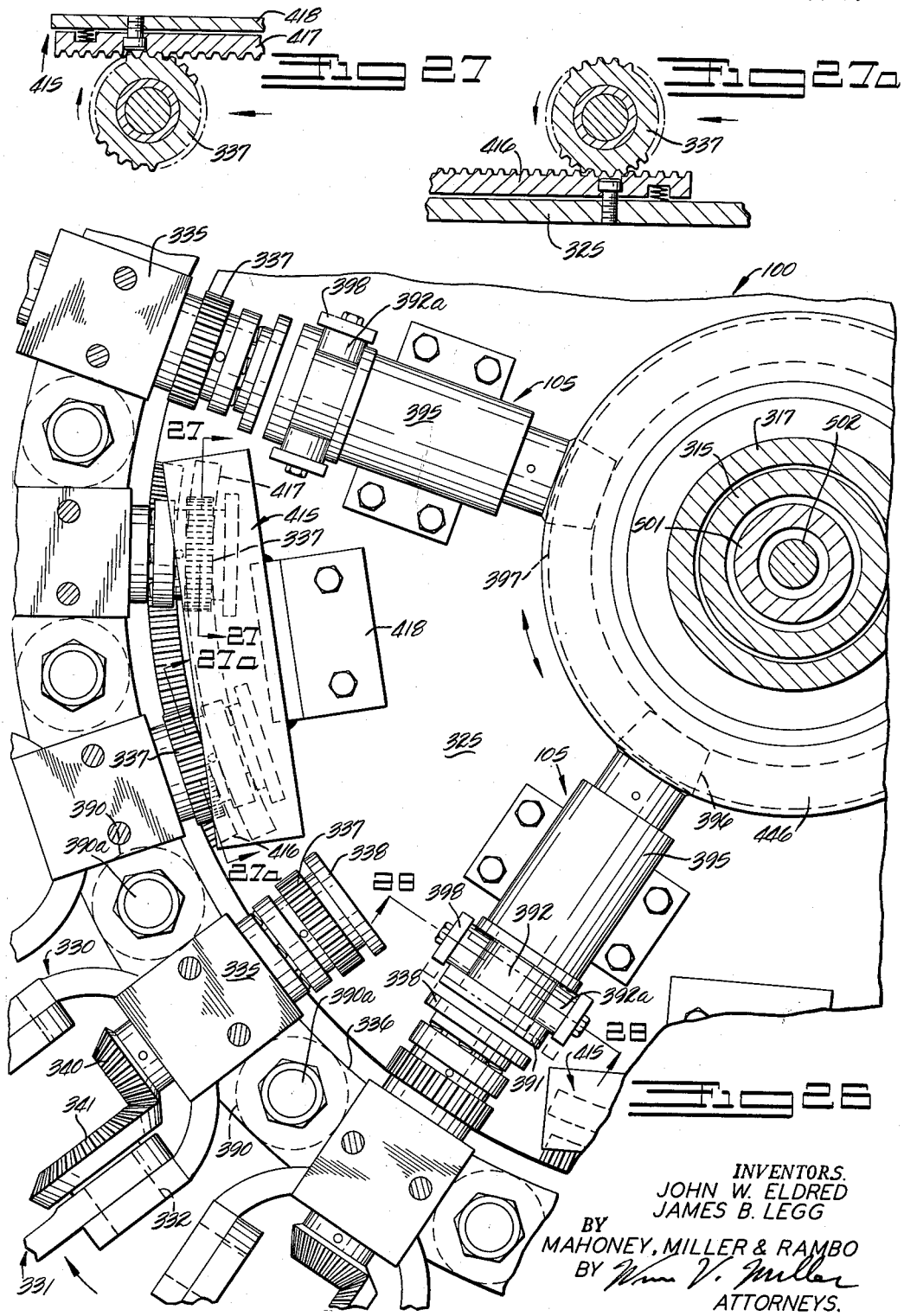

July 9, 1963
J. W. ELDRED ETAL
3,096,709
DECORATING MACHINE
Filed Aug. 4, 1961
23 Sheets-Sheet 15
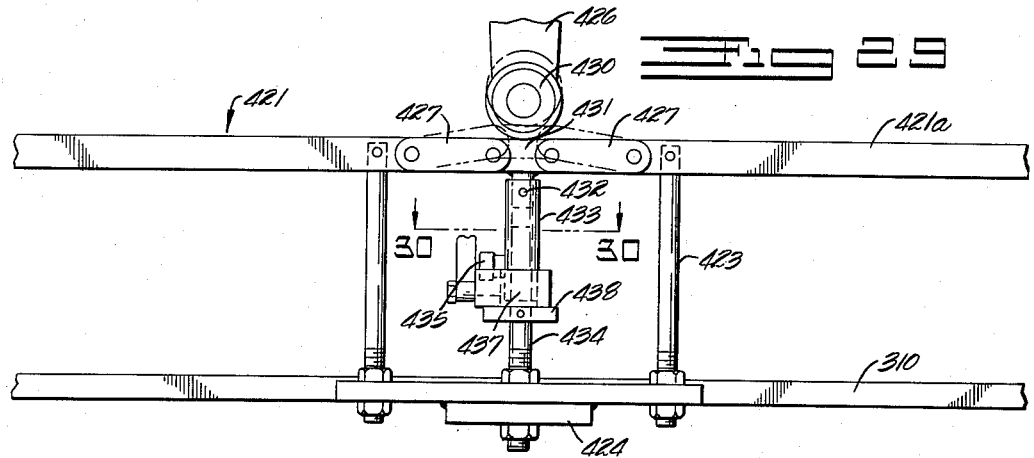
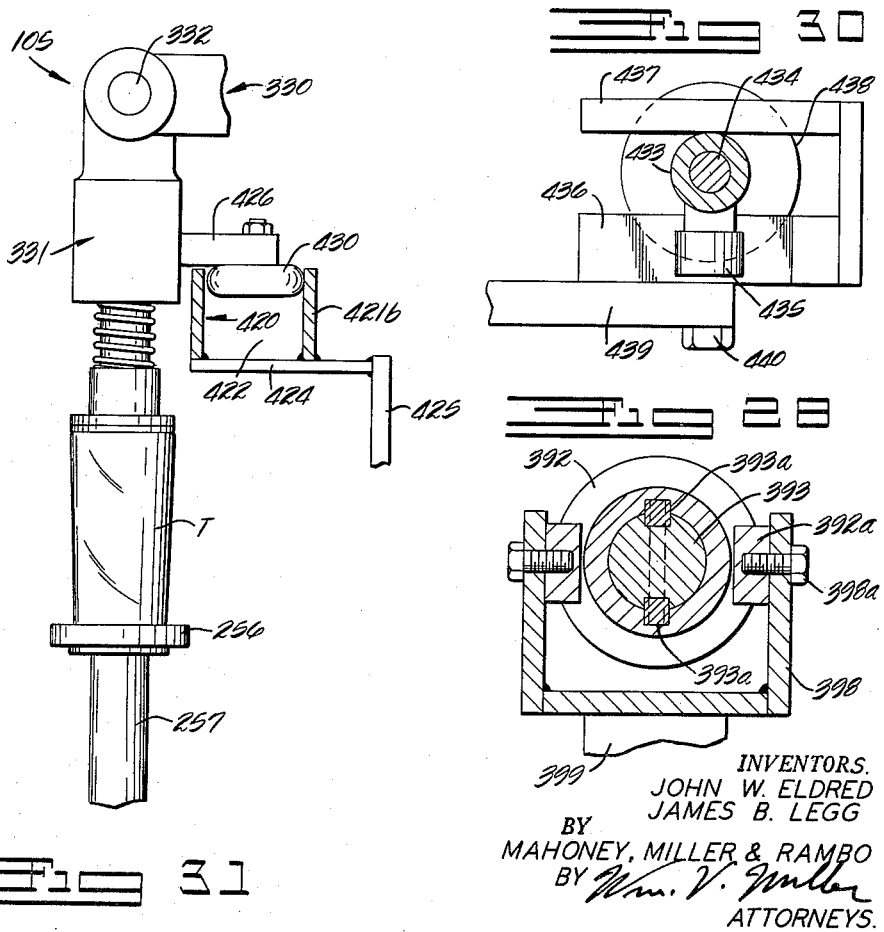
INVENTORS.
JOHN W. ELDRED
JAMES B. LEGG
BY
MAHONEY, MILLER & RAMBO
BY
ATTORNEYS.

INVENTORS.
JOHN W. ELDRED
JAMES B. LEGG
BY MAHONEY, MILLER & RAMBO
ATTORNEYS.

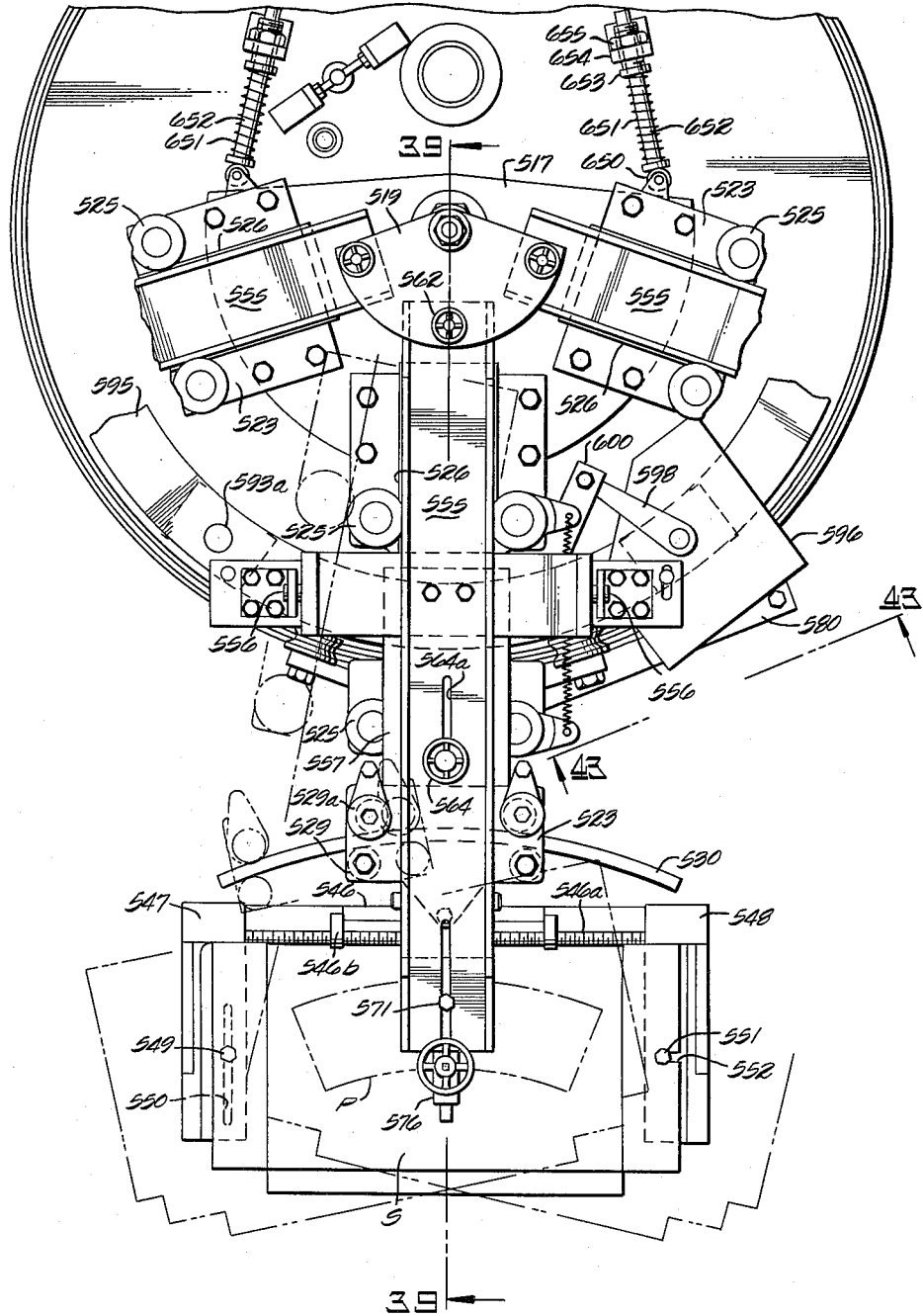

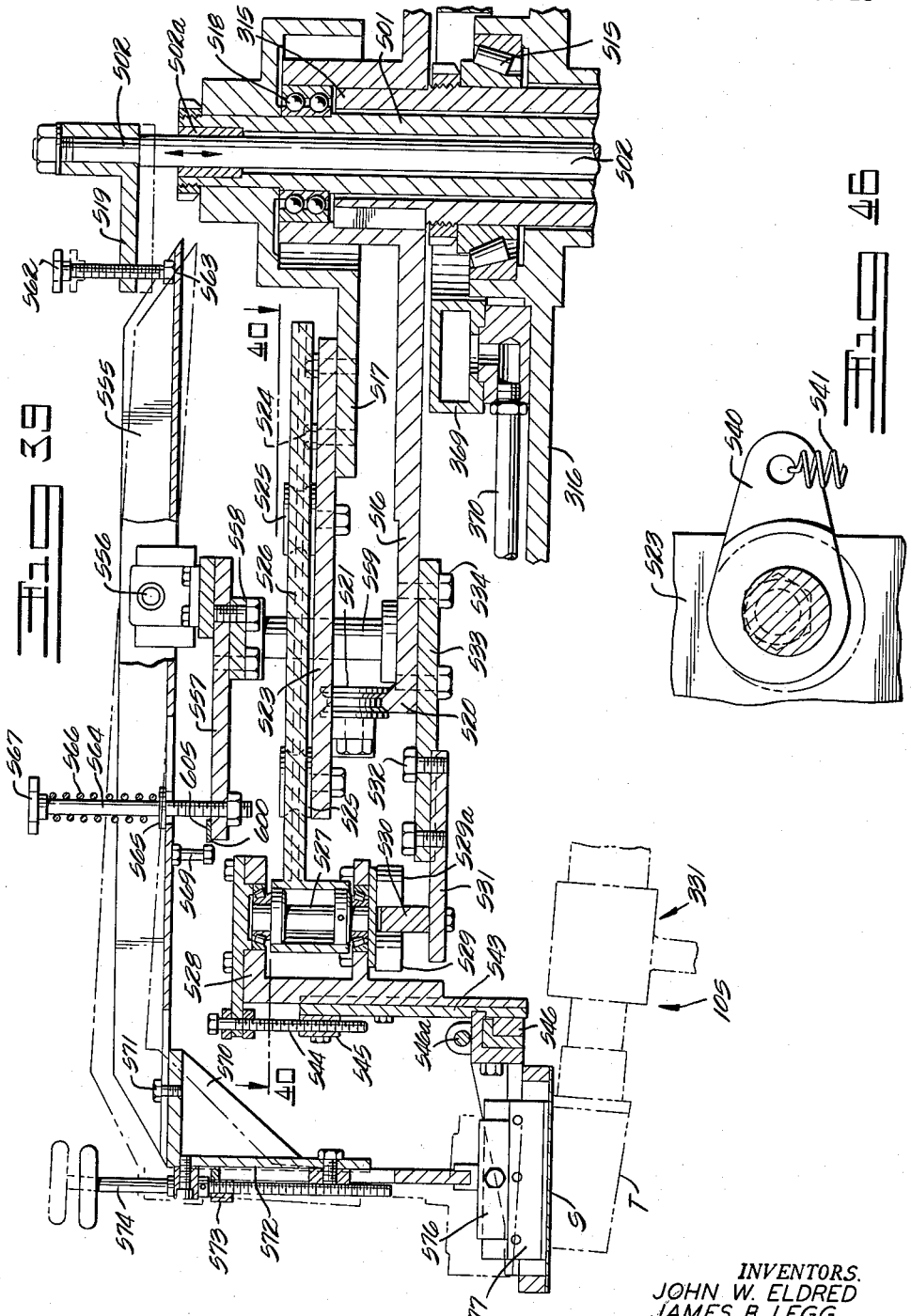

July 9, 1963

J. W. ELDRED ETAL 3,096,709

DECORATING MACHINE

Filed Aug. 4, 1961

INVENTORS.
JOHN W. ELDRED
JAMES B. LEGG
BY
MAHONEY, MILLER & RAMBO
BY Wm. V. Miller
ATTORNEYS.

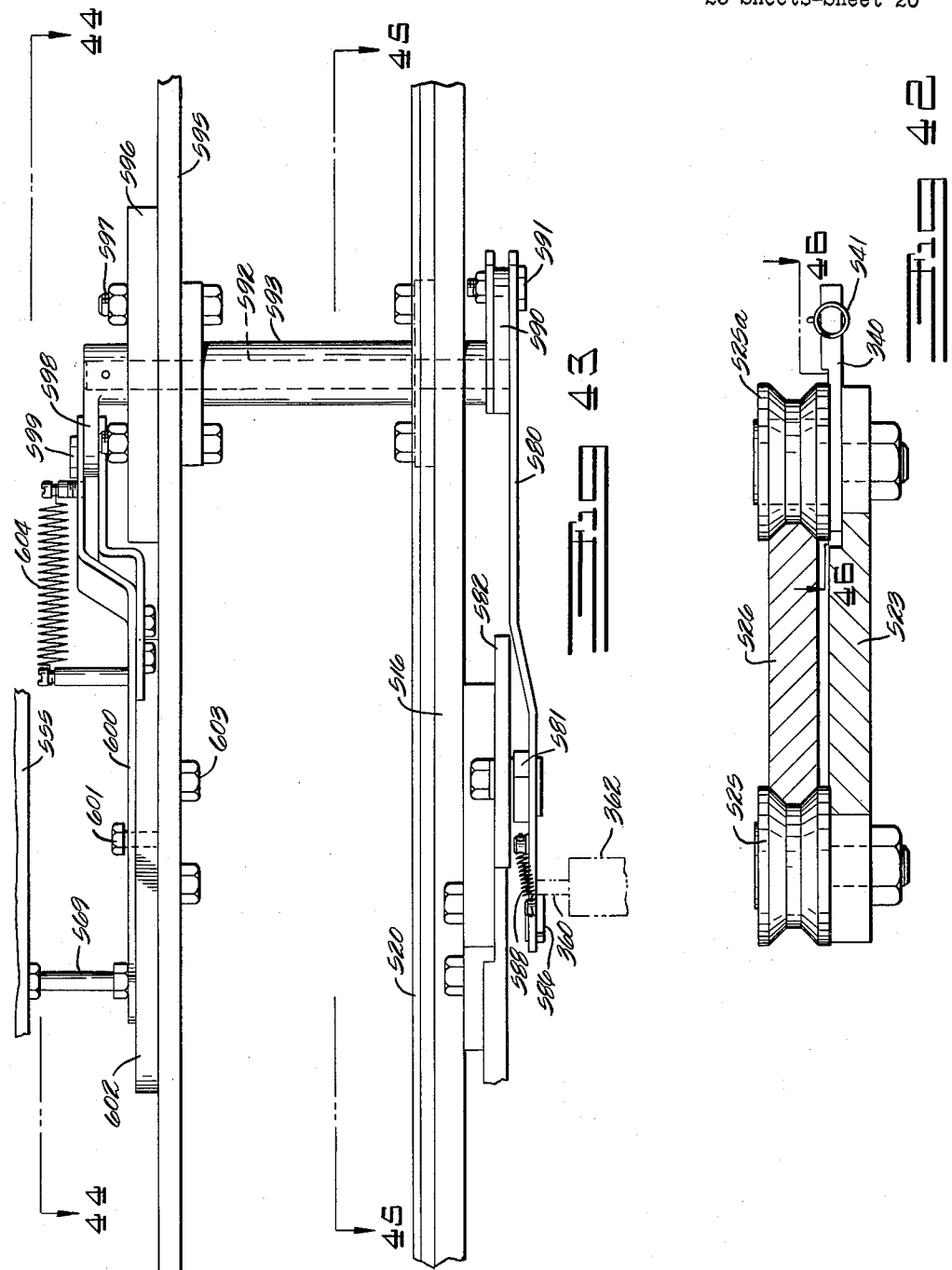

July 9, 1963  J. W. ELDRED ETAL  3,096,709
DECORATING MACHINE

Filed Aug. 4, 1961  23 Sheets-Sheet 21

INVENTORS.
JOHN W. ELDRED
JAMES B. LEGG
BY MAHONEY, MILLER & RAMBO
BY Wm. V. Miller
ATTORNEYS.

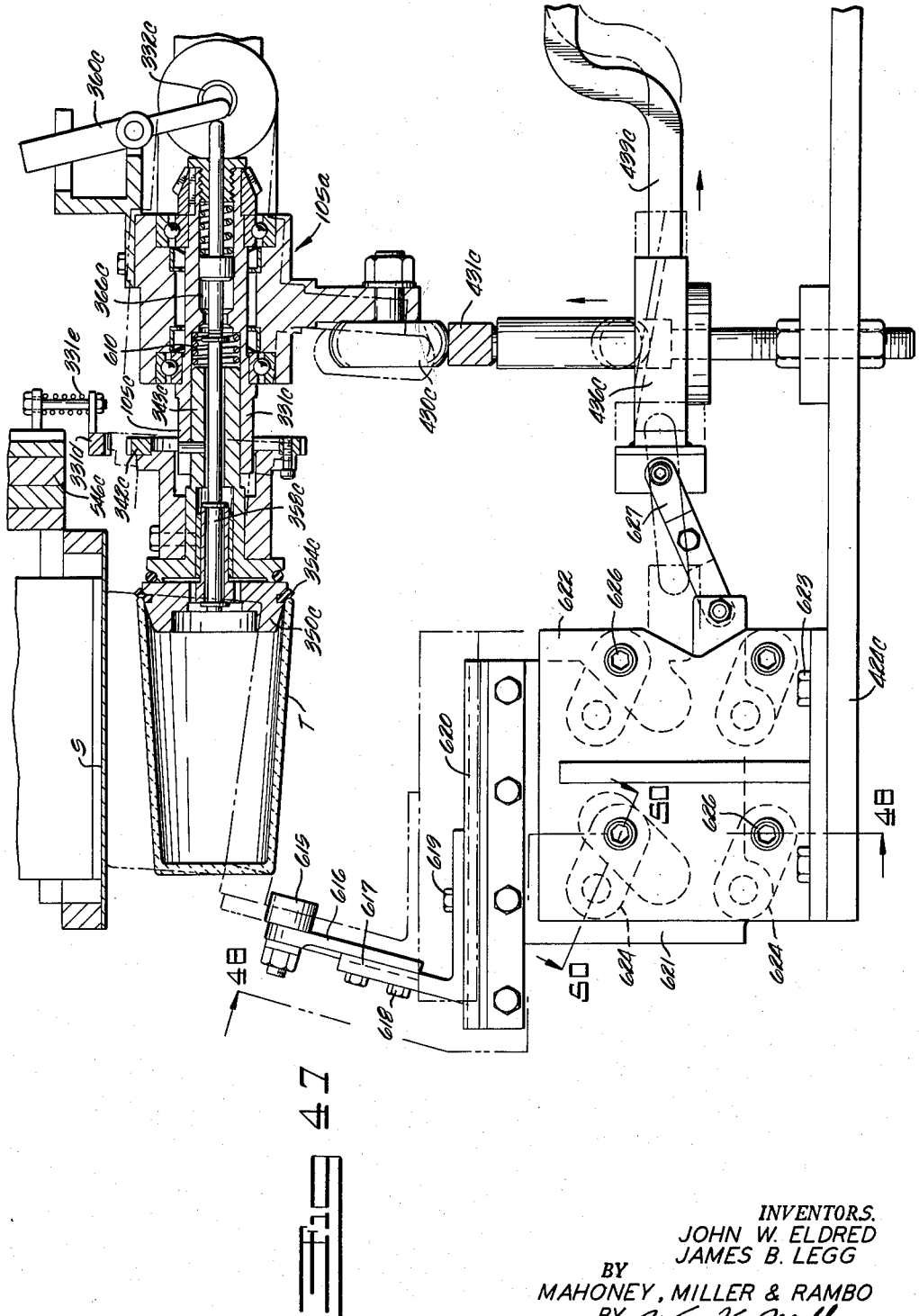

July 9, 1963

J. W. ELDRED ETAL 3,096,709

DECORATING MACHINE

Filed Aug. 4, 1961

INVENTORS.
JOHN W. ELDRED
JAMES B. LEGG
BY
MAHONEY, MILLER & RAMBO
BY Wm. V. Miller
ATTORNEYS.

3,096,709
Patented July 9, 1963

3,096,709
DECORATING MACHINE
John W. Eldred and James B. Legg, Columbus, Ohio, assignors to The Eldred Company, Columbus, Ohio, a corporation of Ohio
Filed Aug. 4, 1961, Ser. No. 129,455
42 Claims. (Cl. 101—115)

Our invention relates to a decorating machine. It has to do, more particularly, with apparatus for applying decorations, including designs and lettering, to the surfaces of various articles and especially hollow articles. The machine is designed especially for decorating hollow articles of glassware, such as tumblers, and will be described with specific reference thereto but it is to be understood that this is for illustrative purposes only since the machine is capable of decorating other articles. The machine uses the silk-screen and squeegee process and is capable of applying decorations in a single color or in multiple colors.

One of the main objects of our invention is to provide a decorating machine which will automatically apply designs by the silk-screen process to successive articles.

Another object of our invention is to provide an automatically operating decorating machine of the general type indicated which will have successive silk-screen decorating stations in combination with means for intermittently moving the articles to the successive decorating stations and accurately indexing them relative to such stations.

Another object of our invention is to provide a machine of the type indicated above in which the design may be applied to the articles at successive stations in different colors and which is provided with means for registering the successive color design patterns with absolute accuracy and without distortion of one color pattern by another.

Another object of our invention is to provide a decorating machine of the type indicated above in which the screen and squeegee decorating mechanisms at all the stations are controlled from a single control cam unit which aids in obtaining the accurate registration of successive color patterns.

Another object of our invention is to provide a decorating machine wherein the articles are supported by compact chucks which are of such a nature that they may be interchanged quickly to receive different sizes or types of articles to be decorated.

Another object of our invention is to provide a machine of the type indicated wherein novel and effective means is provided to move each chuck-supported article into decorating contact with each successive screen after it is indexed into cooperative position therewith.

A further object of our invention is to provide a decorating machine which has means in addition to the chucks for supporting the articles in contact with the screens.

Still another object of our invention is to provide effective means for positively driving the article-supporting chuck with the article engaging a cooperating screen so as to aid in securing accurate registration at successive screens.

An additional object of our invention is to provide a decorating machine of the type described wherein the screens can be removed and replaced easily so as to make it simple to apply the desired design pattern to various articles to be decorated on the machine.

A further object of our invention is to provide a decorating machine of the type indicated which can be used to decorate straight-side, cylindrical articles or to decorate tapering or frusto-conical articles and in which adjustments can be easily and quickly made so that the machine can decorate the different types of articles.

Another object of our invention is to provide a decorating machine of the type indicated which is so designed that parts can be interchanged simply to make it suitable for decorating hollow articles of varying types and sizes.

A further object of our invention is to provide a decorating machine of the type indicated which is so designed that the articles to be decorated are received thereon in upright position and the decorated articles are discharged in upright position, which facilitates loading and unloading, and in which the decorating takes place when the articles have their axes substantially horizontal which facilitates the decorating by the silk-screen process.

The above and other objects, which will be apparent, are accomplished with the machine disclosed in the accompanying drawings and the following description.

In the accompanying drawings, we have illustrated a glassware decorating machine embodying our invention and an associated transfer or loading and unloading unit.

In these drawings:

FIGURE 1 is a schematic plan view of a decorating machine and associated loading and unloading or transfer unit.

FIGURE 2 is a vertical sectional view taken substantially along line 2—2 of FIGURE 1 through the decorating machine.

FIGURE 3 is a vertical sectional view taken substantially along line 3—3 of FIGURE 1 through the loading and unloading means or transfer unit and showing driving and adjusting means thereof.

FIGURE 4 is a horizontal sectional view taken substantially along line 4—4 of FIGURE 3.

FIGURE 5 is a vertical sectional view taken substantially along line 5—5 of FIGURE 6 showing part of the transfer unit drive.

FIGURE 6 is a horizontal sectional view taken substantially along line 6—6 of FIGURE 3.

FIGURE 7 is a horizontal sectional view taken along line 7—7 of FIGURE 3.

FIGURE 8 is a vertical sectional view taken substantially along line 8—8 of FIGURE 4.

FIGURE 9 is a view mainly in elevation taken from the position indicated by the line 9—9 at FIGURE 4.

FIGURE 10 is a vertical sectional view taken along line 10—10 of FIGURE 9.

FIGURE 11 is a horizontal sectional view taken substantially along line 11—11 of FIGURE 10.

FIGURE 12 is a vertical sectional view taken substantially along line 12—12 of FIGURE 10.

FIGURE 13 is a vertical sectional view taken substantially along line 13—13 of FIGURE 11.

FIGURE 14 is a horizontal sectional view taken substantially along line 14—14 of FIGURE 2 through the decorating machine, showing drive means and a master actuating cam therefor.

FIGURE 15 is a horizontal sectional view taken substantially along line 15—15 of FIGURE 14.

FIGURE 16 is a view, mainly in elevation, taken from the position indicated at line 16—16 of FIGURE 14.

FIGURE 17 is a vertical sectional view taken substantially along the position indicated by lines 17—17 in FIGURES 14 and 16.

FIGURE 18 is a plan view of the master cam showing it rotated 180° from the position shown in FIGURE 14.

FIGURE 19 is a vertical sectional view taken substantially along line 19—19 of FIGURE 14.

FIGURE 20 is a horizontal sectional view taken along line 20—20 of FIGURE 19.

FIGURE 21 is a side elevational view taken from the position indicated at line 21—21 of FIGURE 16, showing details of a lever arm used in oscillating the decorating screens.

FIGURE 22 is a view mainly in side elevation taken along line 22—22 of FIGURE 21.

FIGURE 23 is a horizontal sectional view taken substantially along line 23—23 of FIGURE 22.

FIGURE 24 is a vertical sectional view through the spindle assembly at any of the three screen or decorating stations prior to engagement of the screen oscillating clutch.

FIGURE 24a is a continuation of FIGURE 24 and carries line $a^1$—$b^1$ which matches line $a$—$b$ on FIGURE 24.

FIGURE 25 is a horizontal sectional view taken substantially at line 25—25 of FIGURE 24.

FIGURE 26 is a horizontal sectional view taken at the position indicated by line 26—26 of FIGURES 24 and 24a.

FIGURE 27 is a detail in vertical section of the gear and rack spindle rotating assembly taken along line 27—27 of FIGURE 26.

FIGURE 27a is a similar view taken along line 27a—27a of FIGURE 26.

FIGURE 28 is a vertical sectional view taken along line 28—28 of FIGURE 26.

FIGURE 29 is an elevational view taken along line 29—29 of FIGURE 24.

FIGURE 30 is a horizontal sectional view taken substantially along line 30—30 of FIGURE 29.

FIGURE 31 is a view mainly in elevation taken along either of the lines 31—31 in FIGURE 1 at the loading or unloading station.

FIGURE 34 is a vertical sectional view taken along line 34—34 of FIGURE 32.

FIGURE 35 is a vertical sectional view taken substantially along line 35—35 of FIGURE 33.

FIGURE 36 is a vertical sectional view taken along line 36—36 of FIGURE 35.

FIGURE 37 is a vertical sectional view taken along line 37—37 of FIGURE 35.

FIGURE 38 is a top plan view of the decorating machine taken from the position indicated by line 38—38 of FIGURE 2.

FIGURE 39 is a vertical sectional view taken substantially along line 39—39 of FIGURE 38.

FIGURE 42 is a vertical sectional view taken substantially along line 42—42 of FIGURE 40.

FIGURE 43 is an elevational view taken from the position indicated by line 43—43 in FIGURE 38.

FIGURE 46 is a horizontal sectional view taken substantially along line 46—46 of FIGURE 42.

FIGURE 47 is a view partly in side elevation and partly in vertical section of a modified article-supporting chuck and associated means for supporting the article during the decorating operation.

*General Description*

Figure 32:
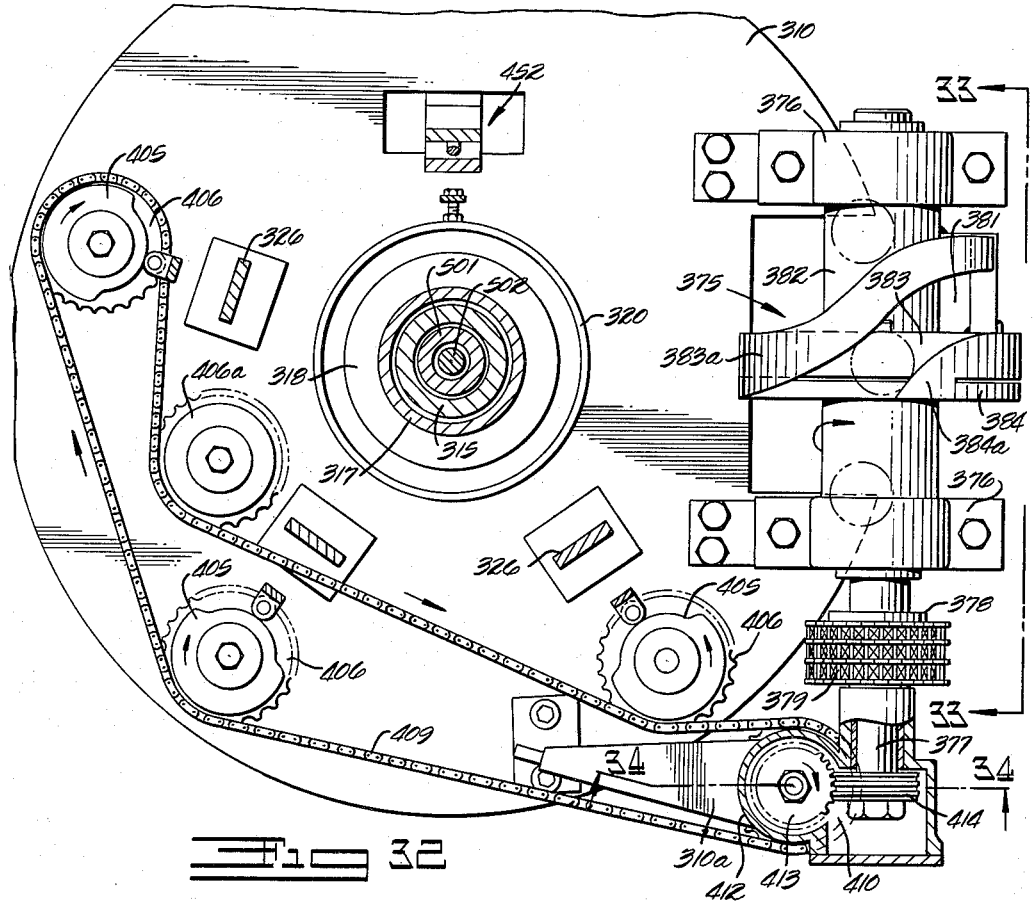
FIGURE 32 is a horizontal sectional view taken substantially along line 32—32 of FIGURE 2 showing the cam for rotating the spindle supporting table and associated mechanism.

With specific reference to the drawings, in FIGURE 1 we have illustrated our glassware decorating machine generally by the numeral 100. It is preferred that this machine be loaded and unloaded by a transfer unit 101. The glassware articles to be decorated may be presented to the transfer unit 101 by means of a continuously driven, straight-line loading conveyor 102 on which the articles are regularly spaced by suitable means and the decorated articles may be received from the transfer unit 101 by a continuously moving straight-line unloading conveyor 103.

The unit 101 shown is of a turret type and is intermittently rotatable. It is provided with a suitable number of article supports 104 angularly spaced therearound, eight of these supports being indicated. The unit 101 in each step is rotated a distance equal to the angular spacing between the article supports 104.

The loading of this transfer unit 101 with glassware to be decorated may take place at the station A; the transfer of each successive supported article to the decorating machine 100 may take place at the station B.

The decorating machine 100 is also of the turret type and is disposed in peripheral overlapping relationship with the unit 101, as shown in FIGURE 1. The machine 100 and the unit 101, as indicated in FIGURE 1 by the arrows, may both rotate in a clockwise direction. The machine 100 comprises a number of spindles 105 which are carried at angularly spaced intervals. The machine 100 is rotated intermittently and in each step moves a distance equal to the angular spacing between adjacent spindles. During this step-by-step rotation, the spindles 105 are moved from a vertical dependent position at the decorating machine loading transfer station B to a horizontal or radially extending position as the machine rotates past successive decorating stations C, D and E and finally back to a dependent position at the unloading transfer station F. Although three decorating stations are shown for illustration, any suitable number may be provided. Also, although there are twenty spindles 105 shown for illustration, it is to be understood that the number could be varied.

From the decorating machine unloading transfer station F, the decorated articles are carried to the transfer unit unloading station G. Instead of the conveyors 102 and 103 being at the positions shown in FIGURE 1 relative to the transfer unit 101, they may be in the relative angular positions indicated by the broken lines and designated respectively "Alternate Loading" and "Alternate Unloading."

*Transfer Unit*

The details of the transfer unit 101 are illustrated best in FIGURES 1 and 3 to 13, inclusive. It includes a hollow base 210 which contains Geneva driving and indexing mechanism and from which an upstanding shaft or column 211 projects. The shaft 211 extends upwardly through a vertically adjustable table 212 upon which are mounted the angularly spaced article supports 104 previously mentioned.

The hollow base 210 is carried by a base plate 213 to which it may be welded and is provided with an antifriction bearing 214 on its bottom wall 215 which receives the lower reduced end of the shaft 211. This shaft extends upwardly through an upstanding bearing sleeve 216 which is carried by the top wall 217 of the base 210 and projects therethrough. Keyed on the lower reduced end of the shaft 211 is a driven Geneva wheel 218 which has a bearing hub 219 that supports a bearing bushing 219a extending upwardly into the lower downward extension 216a of the sleeve 216 and around the shaft 211.

The Geneva wheel 218 is driven by means of a driving roller 220 (FIGURES 3, 6 and 7) which is carried by a crank 221. This crank 221 is keyed on the lower end of a stub shaft 222 which is rotatably mounted in ball bearings 223 carried by a supporting portion 224 of the hollow base 210. The stub shaft 222 has keyed thereon a driven spiral gear 225 which is driven continuously by a driving spiral gear 226. This gear 226 is keyed on a shaft 227 which extends transversely through the hollow base 210, being mounted in a bearing sleeve 228 (FIGURE 4) carried by the hollow base. One end of this shaft 227 on a reduced portion 227a thereof (FIGURE 6) carries a bevel gear 229 keyed thereto and which meshes with a bevel gear 230 keyed on the adjacent reduced end of a continuously driven drive shaft 231 which is disposed at right angles to the shaft 227. The gears 229 and 230 and associated ends of the shafts 227 and 231 are supported by an L-shaped bearing bracket 232. The bracket 232 is carried on a plate 233 which is attached to a plate 235 that supports a continuously driving gear-type reducer unit 234. This unit 234 is carried by the plate 235 which is the base of the decorating machine 100 and the base plate 213 of the unit 101 is also rigidly carried by and extends horizontally out from the base 235. Adjacent the unit 234 is another bearing 236 for the shaft 231. The unit 234 includes a driving gear 237 (FIGURE 5) which meshes with and drives a gear 238 on the associated end of the shaft 231. Thus, it will be apparent that the Geneva drive wheel 218 will be driven intermittently by the continuously driving reducer unit 234 and the shaft 211 will, therefore, be driven intermittently.

The table 212 is concentric with the shaft 211. It includes a central hub 240 (FIGURE 3) through which the shaft extends and which may be clamped to the shaft 211 by means of an adjustable clamp 241. Beneath the hub 240 is a ball bearing 242 at the upper end of a table-supporting and adjusting sleeve 243. This sleeve is slidable vertically on the bearing sleeve 216 upon which it is positioned. The lower end of this sleeve 243 has rigidly attached thereto a worm gear unit 244. A locking screw 243a is carried by the sleeve 243 for engaging the threaded sleeve 216. When the gear unit 244 is rotated, it cooperates with the threaded sleeve 216 so that the gear moves vertically on that sleeve and will move the table-supporting sleeve 243 vertically. During this adjustment, the locking screw 243a and the clamp 241 will be released and both will be tightened after the vertical adjustment of the table 212 is made. The worm gear 244 is rotated by means of a worm 245 (FIGURE 4) meshing therewith. This worm is carried on a hand-operated worm shaft 246 which is rotatably mounted tangential to the gear 244 in a bearing bracket 247 that is attached rigidly to the sleeve 243. Thus, the table 212 may be adjusted vertically, as indicated by broken lines in FIGURE 3, to any desired level by hand operation of the worm shaft 246. The table 212 will be clamped to the shaft 211 and will be rotated thereby. During rotation, the table will be supported by the ball bearing 242 carried on the upper end of the stationary sleeve 243.

The sleeve 243 has a rail-supporting sleeve 250 fixed thereto by means of clamp bolts 251 so that the sleeve 250 will adjust vertically with the table-supporting sleeve 243. The sleeve 250 is provided with sets of radially extending arms 252 at different levels which support rails that are concentric with the shaft 211. The arms 252 support the three rails 253, 254 and 255 at the different levels. The function of these rails will be described later.

The structure of each of the article supports 104 carried by the table 212 is illustrated best in FIGURES 3 and 4. Each support includes an upwardly opening cup 256 which is adapted to receive a suitable article to be decorated which, in the example shown, is a glass tumbler T which is of tapering side wall form. This cup 256 is provided on the upper end of an elevating sleeve 257 which is mounted in a slotted guide sleeve 258 that depends from and is supported by the table 212. The extreme lower end of the sleeve 257 is provided with diametrically extending roller axle housings 259 of square form which carry axles for the rollers 260 mounted on their outer ends. The axle housing 259 extend outwardly through opposed vertical slots 261 formed in the guide sleeve 258. Thus, the sleeve 257 may be moved vertically of the guide sleeve 258 by vertical movement of the rollers 260 but the sleeve 257 will be prevented from rotating within the sleeve 258 by the axle housings 259 extending outwardly through the slots 261.

The bottom of each cup 256 is formed by a vertically movable disc 265 (FIGURE 3). This disc carries a depending pin 266 which is engaged by an enlargement or stop 269 on the upper end of a stem 267. This stem is mounted for vertical movement at the center of the sleeve 257 and its lower end 268 normally projects from the lower end of the sleeve 257 when the stop 269 rests on a shoulder 270 formed within the sleeve 257 adjacent its upper end. At this time the disc 265 is recessed slightly within the cup 256. The lower end 268 of the stem 267 may be engaged to lift the disc 265 when it is desired to remove the tumbler T from the cup 256, as will be described later.

As previously indicated with reference to FIGURE 1, the loading of the decorating machine 100 takes place at the station B and the unloading thereof takes place at the station F. These stations are also indicated relative to the transfer unit 101 in FIGURE 4. At these stations, means is provided for raising and lowering, respectively, each article-supporting unit 104. Each means is actuated by and in timed relationship to the rotation of the Geneva drive shaft 227. Thus, as shown in FIGURES 4, 6 and 9 to 12, the means at the station B comprises a cam-actuated lever 271. This lever has one end pivoted at 272, for vertical swinging movement, to an upstanding support 273 which is attached to the base plate 213. The opposite end of the lever 271 is provided with a slot 274 (FIGURE 9) which receives a roller 275 that is carried on the lower end of a vertical slide member 276 (FIGURES 10 to 12). The lever 271 is swung vertically by means of a cam 277 which engages a cam follower 278 (FIGURE 9) in the form of a roller mounted intermediate the ends of the lever 271. The cam 277 is keyed on the reduced extension 227a of the shaft 227.

The slide 276 is mounted for vertical sliding movement in an upstanding slideway 279 (FIGURES 10 to 12) which projects upwardly from the plate 213 to which it is secured. The roller 275 is carried by an axle which projects through a vertical slot 280 in one side of the slideway 279 and which has a bushing 281 that cooperates with the edges of the slot 280. The opposite side of the slideway 279 is provided with a guide slot 282 formed by the oppositely disposed removable guide strips 283. In this slot, a guide block 284 is disposed for vertical movement. This guide block 284 is fastened to the slide 276 by means of pairs of clamp bolts 285 which pass through associated pairs of slots 286 in the block 284 and which cooperate with selected pairs of bolt openings 287 disposed vertically along the slide member 276. Thus, the block member 284 may be readily mounted at different positions along the slide member 276.

The vertical block member 284 is provided with an outwardly projecting horizontal arm 288 (FIGURE 11) which is angularly disposed relative thereto and may be suitably secured thereto, such as by welding. This arm has pivoted to its outer end, by a vertical pivot pin 289, a swingable arm 290. This arm is normally swung inwardly toward the arm 288 by means of a spring 291 connected to the respective arms. The outer end of the arm 290 at its upper surface has mounted thereon a shoe 292 (FIGURES 10 and 13). This shoe is mounted on the arm by means of pins or bolts 293 which are disposed in openings in the arm 290 for limited vertical movement and which have associated therewith the springs 294 which tend to hold the shoe in its uppermost position.

It will be apparent that rotation of the cam 277 will swing the lever 271 vertically and will produce vertical movement of the slide 276 in the slideway 279. This will raise or lower the arm 288 and the arm 290 pivoted thereto. Raising of the slide 276 will occur at the decorating machine loading station B. Raising of the arm 290 at this station will cause the shoe 292 carried thereby to engage the outer roller 260 of the article-support 104 which has been moved by rotation of the table 212 into loading position at that time. This will lift the sleeve 257 of the article-support to the position shown at the left in FIGURE 3 from the position indicated at the right in that figure. As the member 257 is lifted to the position indicated, latching means acts to hold it in that elevated position. This latching means comprises a latching lever 295 (FIGURES 3, 4 and 8) which carries a depending cam shoe 296 on its free end, the lever being pivoted at 297 to the uppermost rail 255. A pin and spring assembly 298 normally urges the latching lever 295 outwardly, as shown by full lines in FIGURE 4, but it is yieldable inwardly, as indicated by the broken lines. Thus, as the member 257 is raised, the inner roller 260 carried thereby will engage the cam surface of the latch cam 296 and swing it inwardly, as indicated by the broken lines in FIGURE 8, until the roller moves above the cam, at which time the blunt upper end of the cam will be positioned under the roller by outward swinging of the latching lever 295, as indicated by the full lines in FIGURE 8. This will hold the member 257 at its elevated position and the inner roller 260 will travel along the guide rail 255 upon continued rotation of the table 212 and during the loading of the decorating machine 100. The slide 276 will be lowered upon further rotation of the cam 271 and rotation and indexing of the table 212 but the rail 255 will continue to hold the member 257 in elevated position during the decorating machine loading operation at station B.

As the loading operation of the decorating machine is completed, it is necessary for the article support 104 to move downwardly to the elevation of the table 212. At this time, after the article support has been moved by indexing of the table 212 to the unloading station F, as shown in FIGURE 4, the inner roller 260 will be off the supporting rail 255 and the stem 267 will be off the cam 268a. To gradually lower the sleeve 257, a cam controlled slide and lever system like that described with reference to the loading station is provided. This system includes the pivot arm 290a, the fixed arm 288a, the vertical slide 276a, the slideway 279a, the lever 271a, the cam 277a and the cam follower 278a. This cam 277a is at the opposite end of the shaft 227, as indicated in FIGURE 4.

When the elevated article-supporting sleeve 257 reaches the decorating machine unloading position or station F and the inner roller 260 is off the supporting rail 255, the outer roller 260 is supported by the shoe 292a on the arm 290a and the cam 277a actuates the lever 271a, through the follower 278a, to lower the slide 276a and the arm 288a carried thereby, thereby lowering the sleeve 257 to permit the article-holding cup 256 to return to its lowermost position where it is recessed within the table 212 to facilitate unloading from the transfer unit 101.

Thus, it will be apparent that the transfer unit 101 will serve to transfer articles from the conveyor 102 at the transfer loading station A, carry each article successively to the station B where the article is raised to decorating machine loading position, maintain the article support in elevated position until it reaches the decorating machine unloading station F at which point a decorated article will be received from the decorating machine 100, and then lower the article support to the transfer unit unloading level of the station G. All of these functions will occur during the successive indexing of the table 212 to bring the article supports 104 to their successive stations. At the transfer unit unloading station G, the decorated article will be positioned on the conveyor 103.

The rails 253 and 254 are provided for use in case of wide variation in the height of ware to be decorated. They are not shown in detail like the rail 255 but may be of the same construction and have the latching lever 295 and associated mechanism thereon. When the different rails 253, 254 or 255 are selected, the vertical position of the pivot 272 for the lever 271 is selectively varied to the necessary level in the openings 299 in the upstanding support 273 (FIGURE 9).

Although we have not illustrated how the articles are transferred from the conveyor 102 to the unit 101, and from the unit 101 to the conveyor 103, it will be understood that this can be accomplished by the usual transfer means familiar to the art. At the unloading station of the transfer unit where the article is removed from the table 212, the stem 268 is engaged by a stationary cam 268b (FIGURES 3 and 4) to lift the disc 265 above the level of the upper edge of the cup 256 to permit sweeping of the article by suitable means (not shown) from the table 212 onto the conveyor 103.

*Decorating Machine*

The decorating machine 100 is illustrated in general in FIGURES 1 and 2 and in detail in FIGURES 14 to 45. As previously pointed out, this machine is of the turret type and is intermittently rotatable. It includes the angularly spaced spindle units 105 which are moved step-by-step from the loading station B, past decorating stations C, D and E and finally to the unloading station F, these stations being indicated in FIGURE 1.

The decorating machine includes the base 235 previously mentioned and which is shown in FIGURES 2 and 14. This base may be mounted on caster rollers 300 and the base may be provided with depending floor-engaging jack screws 301 which will normally contact the floor to hold the machine in a fixed position but which can be screwed upwardly to be disengaged from the floor and permit movement of the machine.

The base 235 carries the gear type reducer unit 234. This unit is driven by means of a belt drive 302 from an electric motor 303 mounted on the base 235. The unit 234 drives a gear unit 304 which, in turn, drives the master actuating cam 305. This cam is in the form of a horizontally disposed plate which is keyed on a shaft 306 upstanding vertically from the unit 304. This cam is adapted to actuate mechanism on the rotatable turret 307 which carries the spindle assemblies 105. The turret 307 is carried by a supporting frame 309 which is upstanding from the base 235. This frame includes a stationary horizontal supporting plate or table 310 of disc form. The table 310 (FIGURES 2 and 24a) carries a concentric sleeve or standard 315 which projects above and below the table. Intermediate its height, the standard 315 carries a rotatable spindle-supporting table 316 which is part of the turret 307. This table 316 is rotatably mounted by means of an integral depending concentric sleeve portion 317 which has the outer raceway 318 of a roller bearing on its lower end, the inner raceway 319 being carried by the standard 315 above the horizontal table 310, formed integral with the standard, and having an upwardly projecting annular flange 320 surrounding the bearing. Surrounding the sleeve portion 317 is a stationary horizontal supporting shelf 325 of disc form (FIGURES 2, 24a and 26) which is located directly below the spindle assemblies 105. This shelf 325 is fixed to the table 310 by upstanding support brackets 326 disposed at angularly spaced intervals adjacent the decorating stations C, D and E.

The spindle assemblies 105 are supported on the table 316 in angularly spaced relationship. These assemblies are illustrated best in FIGURES 2, 24, 25 to 28, 30 and 31. Each spindle assembly 105 comprises an inner section 330 (FIGURES 2 and 24) which is always in radially extending horizontal position and an outer section 331 which is connected to the section 330 and is vertically swingable relative thereto about a horizontal pivot 332 connecting interfitting yoke portions 330a and 331a respectively (FIGURE 25). As previously indicated, the section 331 is adapted to be in a dependent position at the loading and unloading stations B and F (FIGURE 1) and in a horizontal or radially extending position with its axis aligning with that of the section 330 as it passes the decorating stations C, D and E.

The spindle section 330 embodies a spindle shaft 333 (FIGURES 24 and 26) which is rotatably mounted in a pair of ball bearings 334 carried by a sleeve 335 which is mounted in a bearing bracket 336 carried by the lower surface of the table 316. The projecting inner end of the shaft 333 has a rack gear 337 keyed thereon adjacent the inner bearing 334 and its inner extremity has a clutch face 338 fixed thereon and facing inwardly.

The outer end of the spindle shaft 333 has a bevel gear 340 keyed thereon, as shown in FIGURES 24, 25 and 26. This bevel gear 340 meshes with the bevel gear 341 which is mounted at the pivot axis 332. This gear 341 meshes with the bevel gear 342 which is keyed on the inner end of a spindle sleeve 343. This spindle sleeve 343 is rotatably mounted in a pair of ball bearings 344 carried in the spindle support sleeve 345.

An article-supporting chuck assembly is carried by the spindle-supporting sleeve 345 and includes a chuck disc supporting sleeve 346 which has its inner end inserted in the outer end of the spindle sleeve 343 and removably held therein by a pin and bayonet slot connection 347a. The sleeve 343 carries a radially outwardly projecting stop pin 347 which cooperates with a slot 348 in a stop sleeve 349 that is axially slidable on the sleeve 343 which it surrounds and is attached concentrically to a disc 350. A compression spring 351 is provided between the outer bearing 344 and the inner end of the stop sleeve 349 to tend to force outwardly the sleeve 349 and the disc 350 which it carries.

The disc 350 (FIGURE 24) along with a centering ring 352 is clamped on the sleeve 346 by means of a clamp nut 353 which is threaded on the sleeve 346 and a diaphragm 354 is clamped between the members 350 and 352, it being noted that the disc member 350 and diaphragm 354 project outwardly slightly beyond the member 352. Thus, when the tumbler T is positioned on the chuck, its inner end surrounds the member 352 and engages the diaphragm 354 to seal it on the chuck. Adjacent the outer end of the sleeve 346 is a centering spider 355 which is slidably mounted on the sleeve 346 and is moved outwardly by a compression spring 356 which is between the members 353 and 355, a transverse stop pin 357 being provided to stop outward movement of the member 355.

When an article T is positioned on the chuck, its bottom or closed end engages the outer end of a squeegee latch control stem 358 (FIGURE 24) which is axially slidable to a limited extent in the sleeve 346, projecting through the sleeve 346 and engaging at its inner end the outer end of an axially aligned stem 359. This latter stem projects inwardly through the gear 342 and adjacent the pivot 332 engages the lower end of a latch lever 360 which is pivoted at 361 to a bracket 362, which is attached to the supporting sleeve 345, projecting upwardly through a slot 363 therein. The stem 359 is normally forced outwardly, forcing the stem 358 outwardly, by means of a compression spring 364 surrounding it and engaging a piston 365 carried by the stem and axially slidably within a bore 366 within the sleeve 343. The bore 366 communicates with a bore 367 around the stem 358 which connects with the interior of the article T, when mounted on the chuck, through transverse openings 368 in the member 346 which are outwardly of the member 353. The bore 366 may be connected through ports 368a, annular chamber 370a in the member 345 and a flexible conduit 370 (FIGURES 2 and 25) to a vacuum manifold ring 369. The ring 369 is carried by the table 316 for rotation therewith and is connected to a vacuum source by a line 371.

It will be apparent that the spindle section 331 can be swung vertically about the pivot 332. During this swinging, the gear 342 on the inner end of the spindle sleeve 343 will travel around the axis of the meshing gear 341. Thus, the drive to the outer spindle section 331 and specifically the chuck carried thereby on the sleeve 343 can be maintained regardless of the vertical position of the outer section of the spindle assembly.

The table 316 (FIGURE 2) can be rotated relative to the stationary shelf 325. This rotation is an intermittent rotation and in each step of rotation the table is rotated a distance corresponding to the spacing of the spindle assemblies 105. This rotation is accomplished by means of a barrel cam 375 which is shown best in FIGURES 2 and 32 to 37. This cam is such that the table 316 will be moved quickly between each of its successive positions but will be retained at each position to which it is moved for a relatively long period. In other words, its dwell periods are longer as compared to the moving or indexing periods. The cam 375 is carried for rotation about a horizontal axis by means of the bearing supports 376 (FIGURES 32 and 33) which are upstanding from the table 310. It will be noted from FIGURE 32 that the axis of the cam is tangential to the table 310. The supporting shaft 377 of the cam, to which it is keyed, extends outwardly from one of the bearings 376 and carries sprockets 378 keyed thereto which are driven by vertically extending sprocket chains 379. These chains 379 extend downwardly around sprockets 380 (FIGURE 2) which are mounted on and driven by the gear unit 234. Thus, the barrel cam 375 is driven continuously.

The barrel cam 375 is provided with a cam groove 381 which traverses a substantially helical path. The cam includes the barrel 382 which carries the discs 383 and 384 that are disposed side-by-side and the disc 383 is axially slidable thereon. These discs 383 and 384 carry the opposed cam tracks 383a and 384a which cooperate to produce the cam groove 381. Between the discs 383 and 384 at their inner faces a series of compression springs 385 (FIGURE 37) are provided in angularly spaced pairs of aligning bores formed in these discs. These springs tend to spread the disc member 383 apart from disc 384 but spreading is limited by a series of stop bolts 386 (FIGURE 36) which are disposed in angularly spaced pairs of opposing bores formed in the disc members 383 and 384. It will be noted that each bolt 386 is anchored to the disc 384 by a threaded end 387 and is slidable in the bore in the disc 383, a head 388 being provided on its other end for engaging the outer face of the disc 383. Thus, the springs 385 tend to move the disc 383 axially away from the disc 384 and the effective thickness of these cooperating discs can be adjusted by rotating the bolts 386, which is useful, as will later appear, in accurately indexing the table 316 to its successive positions.

At regularly spaced intervals around the table 316, as shown in FIGURES 2, 24 and 26, there are provided cam rollers or followers 390 which are rotatably disposed on axles 390a (FIGURE 26) positioned between the spindle-supporting brackets 335 and depending from the table 316. Therefore, each roller axis is located between a pair of adjacent spindle assemblies 105 but each roller depends below such assemblies (FIGURES 2 and 24). Each roller is successively engaged by the barrel cam 375 which rotates continuously, as previously indicated. It will be noted in FIGURE 33 that the cam groove 381 is formed around only a portion of the barrel 382 which in this figure is indicated as the upper portion. The cam groove 381 is shown receiving one of the rollers 390 and continued rotation in a direction indicated by the arrow will move the table 316 one step. Further rotation will cause the roller 390 to move out of the of the groove 381 and, at this time, the mouth or inlet end of the groove will be positioned in alignment with the next roller 390 so as to engage it and index the table through the next step. During the period when there is no roller in the groove 381, there will be a dwell period of the table. Thus, the table 316, which carries the spindle assemblies 105, will be indexed step-by-step by the barrel cam structure. By means of the bolts 386, the cam discs 383 and 384 can be adjusted so that the rollers 390 on opposite sides of the cam discs will be snugly engaged so that firm and accurate positioning of the table 316 at each station will occur. Also, this structure provides take-up for wear so that the tracks 383a and 384a at the sides of the groove 381 will always snugly engage the rollers 390. After the adjustment is made, there will be sufficient flexibility in the mounting of the cam tracks to permit slight variations in hte rollers 390.

During this time the articles T move into association with the successive decorating stations C, D and E for the purpose of registration at successive screens, the article is rotated about its axis by driving the supporting chuck of each spindle assembly 105 through the medium of the bevel gears 340, 341 and 342. The gear 340 is driven by the spindle shaft 333 (FIGURE 24) through the medium of the clutch face 338. This clutch face 338 is driven when the spindle assembly that carries it approaches a decorating station by means of a clutch face 391. This clutch face 391 is carried by a clutch member 392 which is splined for axial but non-rotative movement on a shaft 393. This shaft 393 is carried by a bearing structure including a ball bearing 394 in a bearing housing 395. This housing 395 is bolted or otherwise secured to the upper surface of the supporting shelf 325. The shaft 393 projects inwardly from the housing 395 and carries a bevel pinion 396 (FIGURE 24a) on its inner end. This pinion 396 engages with an oscillatable ring gear 397 of the bevel type. This gear 397 is mounted for oscillating movement about the sleeve portion 317 which supports the table 316 and the manner in which this gear is oscillated will be described later. Oscillation of the gear 397 will oscillate the shaft 393 and if the clutch faces 338 and 391 are engaged, the spindle shaft 333 and the chuck-supporting sleeve 346 will be oscillated, thereby oscillating the chuck and any article supported thereby.

For registration purpose, the yoke member 331a (FIGURE 25) carries a spring pressed stop plunger 331b which projects radially inwardly over the hub of the gear 342. The gear 342 carries a radially projecting lug 342a for contacting with the inner end of the plunger 331b. Contact of these members will locate the article chuck in a predetermined rotative position and will occur when the clutch members 338 and 391 are moved into engagement. Such a clutch is provided near each decorating station, the article will be rotated into a registering position as it approaches the decorating station.

The clutch is engaged, as the associated spindle assembly 105 is at an indexed position just before it reaches the decorating station, by means of a yoke 398 (FIGURES 2, 24, 26 and 28) which carries the radially extending lugs 392a through means of bolts 398a. These lugs are disposed within a groove around the clutch member 392 so that it can rotate relative to the yoke but the yoke can move it axially. The clutch member 392 is splined to the shaft 393 by the keys 393a which permits axial movement on the shaft but causes it to rotate therewith. The yoke 398 is carried on the upper end of an actuating lever 399. This lever is pivoted at 400 (FIGURE 24) to an arm bracket 401 extending outwardly from one of the cooperating support brackets 326 and which is mounted thereon by means of bolts 402. Between the lower end of the clutch-actuating lever 399 and the bracket 401 is a compression spring unit 403 which tends to swing the lower end of the lever 399 outwardly. The extreme lower end of this lever 399 carries a cam following roller 404 which is held in engagement with a cam 405 by the spring 403. The cam 405 is clamped to a sprocket 406 and is mounted for rotation about the vertical axis of an axle 407 which is carried in a bearing block 408 attached to the table 310. It will be apparent that there will be three of these cams 405 in association with clutch-actuating levers 399 near the various decorating stations.

Figure 33:
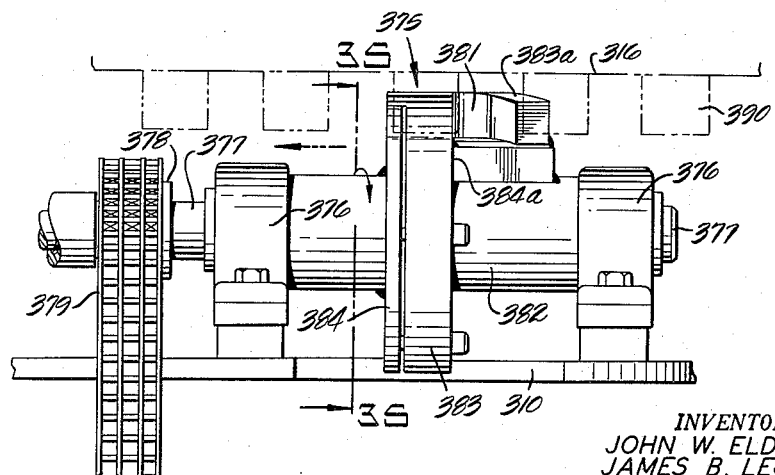
FIGURE 33 is an elevational view taken from the position indicated at line 33—33 of FIGURE 32.

These sprockets 406 are driven in the manner indicated in FIGURES 32 and 33. An endless sprocket chain 409 engages all of these sprockets 406 and will move in the direction indicated by the arrow in FIGURE 32 to rotate the sprockets and therefore the associated cams 405 in the direction indicated by the arrows applied to the respective cams. An additional idler sprocket 406a is mounted on the table 310 and engages the sprocket chain 409. This chain 409 is driven by a sprocket 410 around which it passes. This sprocket 410 (FIGURE 34) is keyed on the lower end of a vertical shaft 411 which is mounted in a bearing on a support plate 310a (FIGURES 32 and 34) extending from the plate 310. A housing member 412 encloses a worm gear 413 keyed on the upper end of the shaft 411 which is engaged by a worm 414 that is carried by the barrel cam shaft 377. As previously indicated, this shaft is driven by associated sprockets 378 (FIGURE 32) and the worm 414 will serve to drive the worm gear 413 and the shaft 411 which carries the drive sprocket 410. This will drive the chain 409 continuously which will drive each of the sprockets 406 continuously and, consequently, will drive the associated cams 405 continuously.

Rotation of each cam 405 will produce swinging of the associated cam lever 399 (FIGURE 24) at intervals to engage the clutch members 391 and 338 and therefore to rotate the article-supporting chuck and the article T carried thereby to a predetermined registering position before the decorating station is reached. Thus, each successive article will be rotated into a registering position as it moves into association with successive decorating stations C, D and E. It will be apparent that after contact of the registering stop members 331b and 342a (FIGURE 25) the contacting clutch faces 391 and 338 can slip relatively if necessary because of continued drive of the member 391 by movement of the gear 397 (FIGURE 24a).

In order to rotate the article after it is registered so that it will roll across the screen at each decorating station, each of the rack gears 337 adjacent the clutch face member 338 of each spindle assembly 105, as indicated in FIGURES 2, 24, 26, 27, 27a, is engaged by a rack bar of a rack unit 415 which is secured to the table 325. Each rack unit 415 embodies a pair of rack bars including lower rack bar 416 and an upper rack bar 417 which are disposed adjacent the edge of the shelf 325 and are curved in parallel relationship to its edge (FIGURE 26). It will be noted that the rack gears 337 of alternate spindle assemblies 105 are located at slightly different radial positions and the respective racks 416 and 417 are located at corresponding radial positions. Therefore, as indicated in FIGURES 26, 27 and 27a, one of the gears 337 will engage the upper rack 417 (FIGURE 27) whereas the next gear 337 will engage the lower rack 416 (FIGURE 27a). Consequently, the shafts 333 of successive spindle assemblies 105 will be rotated in opposite directions and, therefore, the artcles on successive chucks of the assemblies will be rotated in opposite directions as they cooperate with the screens at the decorating stations. The rack bar 416 is bolted directly to the shelf 325 whereas the upper bar 417 is bolted to a supporting bracket 418 which is upstanding from the shelf 325 to which it is attached.

As previously indicated, in advancing the spindle supporting table 316 step-by-step, the outer section 331 of the assembly is swung between a dependent position, as shown in FIGURE 31, to a horizontal position, as shown in FIGURES 2 and 24. For producing this vertical swinging movement of section 331, a cam track 420 is provided which extends completely around the table 310 and is supported thereby. This cam track follows an annular path and comprises a supporting rail section 421 (FIGURE 29) which controls the elevation of the spindle assembly section 331 during the various decorating operations and a grooved section 422 which hold the spindle assembly section 331 in dependent position, as shown in FIGURE 31, at the loading and unloading stations B and F. The supporting rail section 421 is supported by upstanding posts 423 carried by bracket arms 424 extending radially outwardly from the table 310. The grooved section 422 is at a lower level than the supporting section 421 and is carried by arms 424 (FIGURE 31) supported by an upstanding plate 425 which is attached to the table 310. It will be apparent that the supporting surface 421a of the rail 421 gradually twists from a horizontal position (FIGURE 29) to a vertical position indicated at 421b (FIGURE 31) where it is at the inner surface of the groove 422.

Each of the spindle assembly sections 330 carries a roller 430 at a position outwardly of the pivot 332 (FIGURES 24 and 31). It will be apparent that the axis of the roller 430 will change between vertical (FIGURE 31) and horizontal (FIGURE 24) positions as the table 316 is indexed to successive positions. The position of the roller 430 of any spindle assembly at any decorating station is indicated in FIGURE 29. At this position, the supporting rail 421 is provided with a pair of pivoted links 427 (FIGURE 29) which have one of their ends pivoted to the main rail section and their inner ends pivoted to a connecting member 431. This connecting member 431 has pivoted thereto at 432 the upper bifurcated end of a sleeve 433. The lower end of this sleeve 433 is slidable vertically on a pin 434 which is upstanding from the associated bracket arm 424. The sleeve 433 carries an outwardly projecting roller 435 (FIGURES 24 and 30) which is engaged by a wedge cam surface 436. This wedge surface is at one side of a guide structure 437 which straddles the sleeve 433 and which slidably rests on a disc support 438 carried by the pin 434. Obviously, when the wedge surface 436 is moved inwardly, the member 431 is raised and this swings the pivoted link rail sections 427 upwardly to produce a lifting action on the associated roller 430. This, as will later appear, will raise the article into contact with the associated decorating screen. The cam surface 436 is pulled inwardly at the same time that the associated clutch is actuated by the lever 399. This pull is produced by means of a connecting rod 439 which is pivoted to the member 437 at 440 and is pivoted to the lower end of the lever 399 at 441.

As previously indicated, oscillation of the gear 397 actuates the various clutches, which are near the successive decorating stations C, D and E, to drive the article chucks so as to move the articles T supported thereby to a predetermined registering position about each of their axes. As indicated in FIGURE 24a, the gear 397 rests on the bearing bushing 445 which surrounds the sleeve portion 317 of the table 316 and which is supported centrally within the shelf 325. This gear 397 is bolted to a plate 446 which has an upstanding flange 447 that engages the lower surface of the table 316. Thus, the plate 446 and the gear 397 are oscillatable as a unit relative to the fixed shelf 325 and relative rotation of the spindle assembly supporting table 316 is also permitted.

The means for oscillating the gear 397 is illustrated best in FIGURES 14, 16, 21, 22 and 23. For this purpose, there is rigidly attached to the plate 446 a depending arm bracket 448 (FIGURES 16 and 21). This bracket is provided with a depending universal pivot 449 at its lower end which connects it to a horizontal connecting link 450 which is adjustable as to length. This link 450 is pivoted, by a universal pivot 451, to the upper end of an arm unit 452. The arm unit 452 (FIGURES 21 and 22) is pivoted for swinging movement adjacent its upper end by means of a pivot pin 453 carried on the upper end of an upstanding support 454. The lower end of this support 454 is pivoted by a bolt 455 to the upstanding flange 320 carried by the fixed table 310.

The arm structure 452 includes the upper arm section 456 and the lower arm section 457 which are adjustably connected together for relative vertical adjustment. The lower section 457 is rigidly connected to the table 310 by means of a bracket 458 and extends through a large opening 459 in the table 310. The section 456 also extends through this opening and in parallel relationship to the section 457. The section 457 carries a pivot block 460 by means of a screw 461 threaded therethrough and which is rotatably carried on the section 457. By rotating the screw 461, the block 460 is moved vertically along the section 457 and may be clamped thereto (FIGURE 23) in fixed vertical position by clamping means 462. The section 456 is pivoted to the block 460 by a pivot bolt 463 (FIGURES 21, 22 and 23) which passes through a bushing 464 that is mounted in a vertically extending slot 465 in the arm section 456. The bolt 463 also passes through a disc 466 which bears against the outer face of the section 456, the inner face contacting the block 460. Thus, the pivot point 463 may be adjusted vertically along the section 457 by means of the screw 461 to determine the extent of oscillation of the arm section 456 and therefore of the gear 397.

The arm section 456 is oscillated by means of a link 467 (FIGURE 14) pivoted thereto by a horizontal pivot 468 at its lower end. The other end of this link 467 is pivoted by a vertical pivot 469 to one end of an actuating lever 470. This lever is pivoted intermediate its ends at 471 to a horizontal support 472 extending outwardly from the sleeve or standard 315. The opposite end of the lever 470 is connected by a universal pivot 473 (FIGURES 14, 16 and 17) to a connecting link 474 which is adjustable as to length. This link 474 is connected to the upper end of a lever 475 at a horizontal pivot 476 and the lever is pivoted at 477, intermediate its height, on a bracket 478 which is rigidly attached to one of the vertical frame members of the frame 309. The lower end of the lever 475 is pivoted at 479 to the outer end of an adjustable link or turnbuckle 480. The turnbuckle 480 has its opposite end pivoted at a universal pivot point 482 (FIGURES 14, 17 and 18) to an actuating arm 486 which is actuated by the cam plate 305. This arm 486 is pivoted at one end at a vertical pivot 487 on the upper end of an upright supporting post or column 488 (FIGURES 14 to 16) carried by the machine base 235 at one side thereof. This cam 486 extends over the cam 305.

A second arm 481 is provided and extends horizontally over the cam-actuated arm 486 and its opposite end rests on a bearing or spacer strip 485 which is carried by the arm 486 which extends in a direction opposite to that in which the arm 481 (FIGURE 14) extends. Thus, oscillation of the arm 486 will oscillate the arm 481, which, in turn, will oscillate the gear-oscillating arm section 452 and through it will oscillate the gear 397 which actuates the article-registering clutches that register the articles as they approach the decorating stations C, D and E. The arms 481 and 486 are disposed in scissors-like relationship. The one end of the arm 481 is pivoted for horizontal swinging movement by a vertical pivot pin 483 (FIGURES 14 to 16) carried on the upper end of a post or standard 484 supported by the base 235 at the side opposite to the position of the post 488. The spacer 485 serves to keep these arms spaced and to permit the relative scissors-like movement. The arm 486 is provided with a longitudinal slot 490 in which a pivot block 491 is slidably mounted. Threaded through this block 491 is a screw 492 (FIGURE 15) which is rotatably mounted on the arm 486 but is fixed axially thereof. By rotating the screw, the block 491 can be moved longitudinally of the slot 490. The pivot block 491 carries an axle which supports a flanged roller structure 493 that fits snugly within the slot 495 formed longitudinally in the arm 481. It will be apparent that oscillation of the arm 486 will produce oscillation of the arm 481 through the connecting roller structure 493 and that this roller structure will move along the slot 495 of the arm 481. The position of the roller structure 493 along the arm 486 may be varied by the screw 492.

The arm 486 at its outer end carries a cam roller or follower 496 which fits into a cam groove 497 formed in the cam plate 305. As the roller 496 follows the cam groove 497, the arms 481 and 486 will be oscillated about their respective pivots 483 and 487 and will be moved relatively with a scissors-like action. As previously indicated, the cam 305 is driven by the gear unit 304 (FIGURE 16).

The outer or free end of the arm 481 is pivoted at a vertical pivot 498 (FIGURES 14, 16 and 18) to a rigid link 499 that is pivoted at a vertical pivot 499a (FIGURE 14) to a shaft oscillating arm 500. This arm 500 is keyed on the extreme lower end of a central hollow shaft 501 (FIGURE 19) which is rotatably disposed in the central sleeve or standard 315 and is adapted to oscillate the screen assembly as will be described later. Extending vertically through this hollow shaft 501 is a shaft 502 which, as will later appear, actuates the squeegee support assembly. The lower end of this shaft 502 projects from the shaft 501 and is threaded into a guide member 503 which is mainly of cylindrical form and is mounted for vertical sliding movement in a sleeve-like guide sleeve 504 which is supported by and is upstanding from the base 235 (FIGURES 16 and 19). The guide member 503 is provided with a radial tongue 505 (FIGURE 20) which cooperates with a slot in the side of the guide sleeve 504 to prevent relative rotation but to permit relative vertical movement. The tongue 505 carries a roller 506 which engages and follows a cam rail 507 on the lower surface of the cam plate 305. A compression spring 508 normally presses the shaft 502 upwardly and keeps the roller 506 in contact with the cam rail 507. This spring is disposed in the guide sleeve 504 between the guide member 503 and a support 509 in the bottom of the guide sleeve which carries an upstanding centering pin 510.

As indicated in FIGURES 24a and 39, the hollow shaft 501 projects upwardly through the sleeve or standard 315 and beyond the upper end thereof. Also, the shaft 502 projects upwardly through the hollow shaft 501 and beyond its upper end. A roller bearing 515 (FIGURE 39) is provided between the spindle-assemblies supporting table 316 and the standard 315. Keyed on the upper end of the standard 315 so that it will be in a fixed stationary position is a screen and squeegee assembly supporting table 516. Mounted above the table 516 and keyed to the upper end of the hollow shaft 501 for oscillation therewith is a screen supporting segment 517 which is carried by the roller bearing 518 at the upper end of the standard 315. Thus, the table 516 is fixed and the segment 517 can rotate relative thereto. A pair of plungers 652 are provided in cooperation with the segment 517 and tend to keep it in the initial position shown in FIGURE 38 as well as to return it to such position after it is moved. The outer end of each plunger engages a roller 650 carried at each rear corner of the member 517. The rod 652 is slidable axially in a support sleeve 653 carried by a bracket 654 which is fixed to the table 516. A compression spring 651 is disposed between the fixed sleeve 653 and the enlarged outer end of the rod 652 which engages the associated roller 650. A stop nut 655 limits outward axial movement of the rod 652. The reduced upper end of the shaft 502 has clamped in fixed position thereon a squeegee assembly supporting segment 519 which will move vertically therewith. The shaft 502 is slidable vertically in a bearing bushing 502a (FIGURE 39) mounted in the upper end of the shaft 501.

Figure 40:
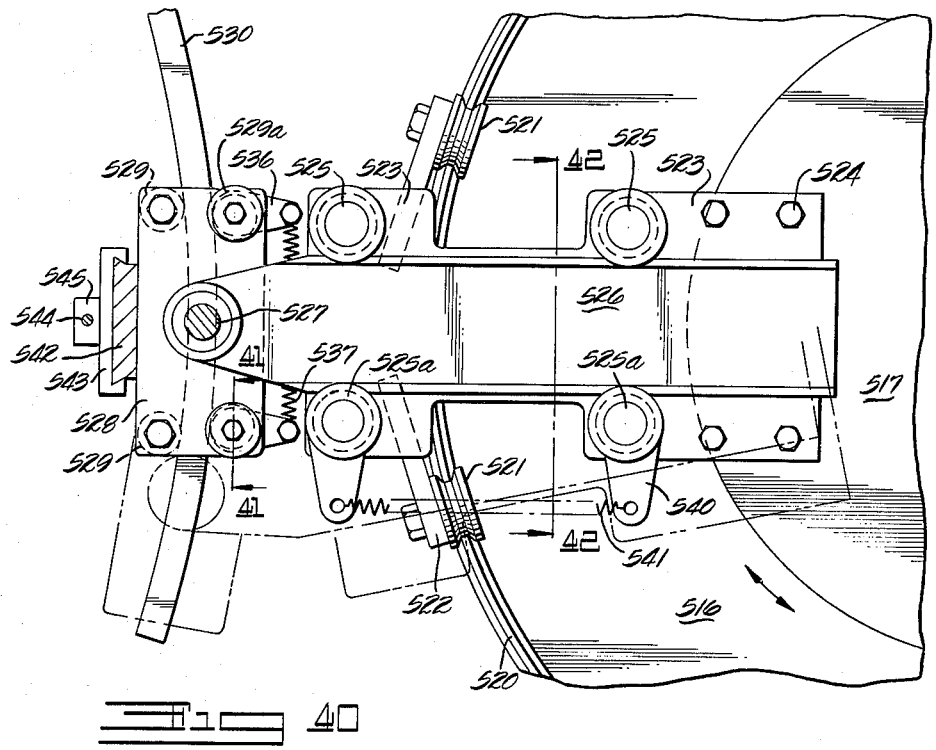
FIGURE 40 is a horizontal sectional view taken substantially along line 40—40 of FIGURE 39.
Figure 41:
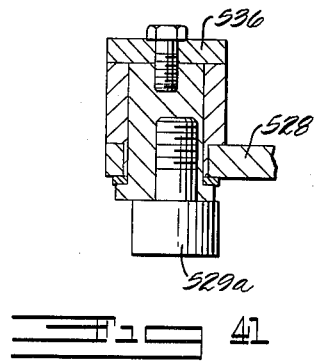
FIGURE 41 is a vertical sectional view taken substantially along line 41—41 of FIGURE 40.

The table 516 has an annular screen assembly supporting track 520 at its peripheral edge (FIGURES 2, 38, 39 and 40) and on this track the grooved rollers 521 operate. These rollers 521 are carried on angularly disposed bars 522 (FIGURE 40) which are rigidly attached to a guide plate 523. This guide plate 523 is bolted at its inner end by bolts 524 to supporting segment 517. The upper surface of the plate 523 is provided with two pairs of grooved guide rollers 525 which receive therebetween a slide member 526 (FIGURES 39 and 40). This slide member 526 extends outwardly beyond the plate 523 and is pivoted by a roller bearing pivot unit at the vertical axis 527 to a screen supporting bracket 528. The lower side of this bracket 528 carries two pairs of guide rollers 529 which engage the inner and outer surfaces of an upstanding guide rail 530 which is of arcuate form. This rail 530 is carried by an arcuate bracket 531 which is bolted by bolts 532 to the outer ends of plates 533 which are bolted at their inner ends by bolts 534 to the table 516. So that the rollers 529 will tightly grip the arcuate guide rail 530, the inner roller 529a of each pair is eccentrically mounted by a rocker arm 536 (FIGURES 40 and 41). A tension spring 537 connects the outer ends of the rocker arms 536 and will rock the arms so that the rollers 529a will yieldably but tightly contact the inner surface of the rail 530. A similar roller arrangement is provided in connection with the slide 526. One roller 525a (FIGURES 40, 42 and 46) of each pair 525 is carried eccentrically by a rocker arm 540. The arms 540 are pivoted towards each other by means of a tension spring 541 which will serve to maintain tight but yieldable contact of the rollers 525a with the one edge of the slide 526 and, therefore, the pairs of rollers in tight engagement with the slide.

It will be apparent that oscillation of the hollow shaft 501 will oscillate the slide 526 relative to the table 516. This will cause the rollers 529 to travel along the guide rail 530 and will pivot the screen supporting bracket 528 about the pivot axis 527. At the same time the slide 526 will have the necessary radial movement within the pairs of rollers 529.

The bracket 528 (FIGURES 38, 39 and 40) is provided with a vertical slideway 542 at its outer side which depends therefrom and which receives a slide 543. This slide is adjustable vertically by means of a screw 544 rotatably carried on the bracket 528 and threaded through a lug 545 on the slide 543. This slide 543 carries at its lower end a horizontally disposed screen-receiving frame 546. The screen frame 546 is adapted to receive and clamp a screen S therebetween. It will be noted (FIGURE 38) that the printing portion P on the screen is of arcuate form since the tumbler T is of tapering form. For this reason, the guide rail 530 is of arcuate form with its curvature parallel to the curvature of the longitudinal axis of the printing portion P of the screen. However, if our decorating machine is being used for decorating straight-sided articles, the screen printing portion P will be straight and the guide rail 530 may be removed and be replaced with a straight rail.

The screen frame 546 (FIGURE 38) is provided with movable end sections 547 and 548 into which the oppositely threaded ends of a screw 546a are screwed, the screw being rotatably mounted in a fixed axial position in lugs 546b on the frame 546. It will be apparent that by rotating the screw 546a, the frame ends 547 and 548 may be moved to clamp the screen S or to release it. The end member 547 of the screen frame is provided with an upstanding locating pin 549 which cooperates with a transverse slot 550 in the screen to locate the screen longitudinally of the frame 546. The other end member 548 is provided with an upstanding pin 551 which cooperates with a longitudinally extending open-ended slot 552 in the screen to locate the screen transversely of the frame 546.

With this arrangement, the screen S oscillates about the axis 527. The tumbler T is raised into flat contact with the undersurface of the screen (FIGURE 39) and its surface will travel at the same linear speed as the screen surface during oscillation of the screen frame 546. The travel of the screen S is produced by oscillation of the hollow shaft 501 through the medium of the cam 305 and the simultaneous oscillation of the tumbler T in the corresponding directions is produced by the associated rack unit 415 during rotation of the table 316 through the medium of the barrel cam 375. In one direction of oscillation of the screen S, the tumbler T is driven by the spindle rotating lower rack 416 (FIGURE 27) and in the opposite direction by the spindle rotating upper rack 417 (FIGURE 27a). The opposite movements of the screen will be over successive articles T indexed into decorating position. Although in the drawings we have illustrated three of the screen assemblies so that three colors may be used in the design printed on each successive article, various numbers of screen assemblies may be provided.

A number of squeegee assemblies corresponding to the number of screen assemblies is provided on the machine, as shown best in FIGURES 2, 38, 39 and 40. Each squeegee assembly includes a radially extending supporting arm 555 which is supported intermediate its ends by a horizontal pivot 556 extending transversely thereof. This pivot 556 is carried by a horizontal plate 557 (FIGURES 2, 38 and 39) which is bolted to a transverse supporting plate 558 carried by a post 559 upstanding from the stationary table 516. The inner end of the arm 555 is connected to the segment 519, which is supported by the shaft 502, by means of an adjustable screw connection 562 which is threaded through the segment 519 and has its lower end pivotally connected at 563 to the end of the arm 555. Radially outwardly, beyond the pivot 556, a screw 564 extends through a slot 564a in the arm 555 and has its lower end anchored in the outer end of the plate 557. This screw has a movable collar 565 which engages the upper surface of the arm 555 and a spring 566 surrounds this screw and is disposed between the collar 565 and the upper knob 567 on the screw. The spring 566 presses the outer end of the arm 555 downwardly but permits yieldable upward movement of the outer end of the arm 555 as its rear end is swung downwardly about the pivot axis 556 which occurs upon downward movement of the shaft 502, as indicated by broken lines in FIGURE 39. A stop pin 569 depends from the arm 555 and acts to limit downward swinging of the outer end of the arm as will be described later.

The outer end of the arm 555 carries a squeegee-supporting bracket 570 which depends therefrom. This bracket is mounted for adjustment radially of the arm 555 by means of a bolt and slot connection 571 (FIGURES 38 and 39). The depending part of the bracket 570 is provided with a slideway 572 on which a slide 573 is mounted for vertical movement. This slide 573 is adjusted vertically of the slideway 572 by means of a screw 574 interconnected therebetween. The lower end of the slide 573 is provided with a clamp 576 for clamping the squeegee 577 thereto. This squeegee 577 will contact the upper surface of the screen S (FIGURE 39) and it will be apparent that its vertical position is controlled by the vertical position of the shaft 502.

Figure 44:
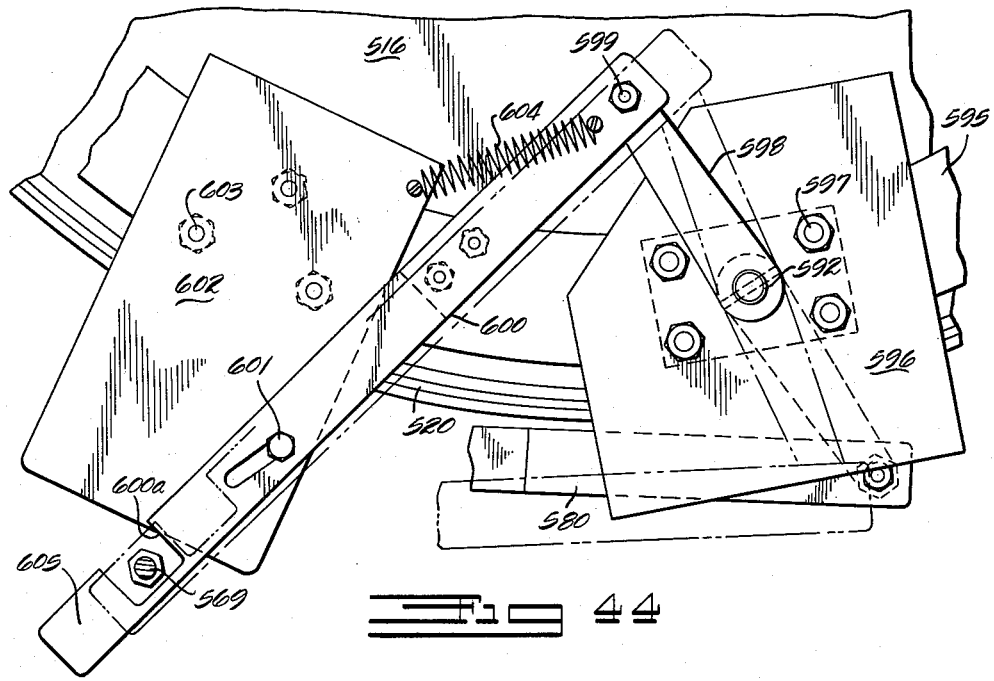
FIGURE 44 is a horizontal sectional view taken substantially along line 44—44 of FIGURE 43.
Figure 45:
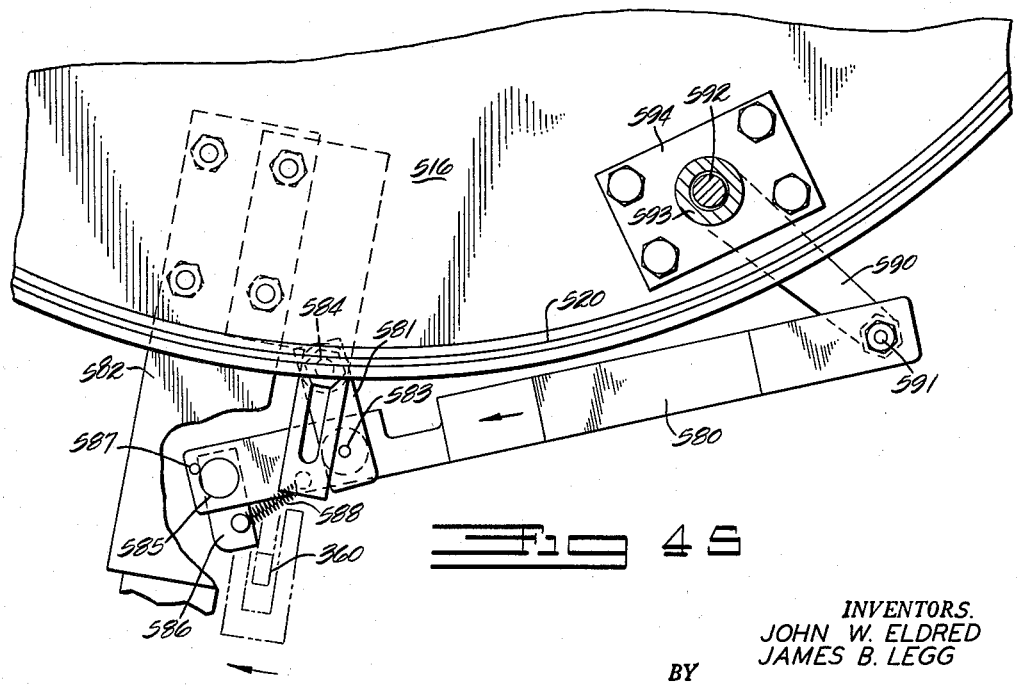
FIGURE 45 is a horizontal sectional view taken substantially along line 45—45 of FIGURE 43.
Figure 48:
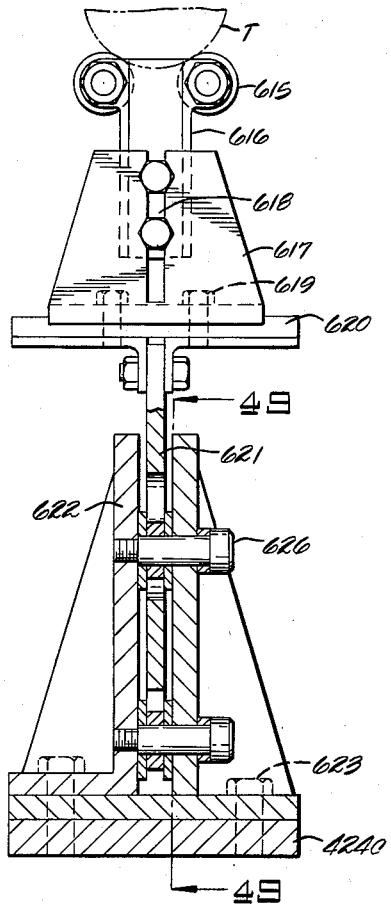
FIGURE 48 is a view partly in elevation and partly in section taken along line 48—48 of FIGURE 47.

It is desirable to prevent each squeegee 577 from contacting its cooperating screen S and moving thereacross to force the paint therethrough if there is no article beneath the screen. Therefore, the linkage arrangement shown in FIGURES 43 to 45 is provided. This arrangement cooperates with the stop pin 569, previously mentioned, on each arm 555 and with the latch lever 360 carried by each spindle assembly 105 which was also previously mentioned. If there is an article on a spindle assembly, the latch lever 360 is swung outwardly (FIGURES 2 and 24) by means of the stem 358 and associated mechanism. On the other hand, if an article is not positioned on the associated spindle assembly, the latch lever will occupy an inner position.

For cooperating with the latch lever 360, the linkage arrangement mentioned above is provided and includes a link 580 which is carried at one end by a pivoted arm 581 which is pivotally mounted on a radially extending plate 582 that is secured to the table 516. The end of the link extends beneath this plate 582 and the arm 581 is pivoted to the link at 583 and to the plate at 584. Pivoted to the end of the link 580 at the pivot point 585 is a contact finger 586 which extends outwardly from the edge of the link 580. A stop pin 587 is mounted on the link adjacent the pivot 585 to limit counterclockwise swinging of the finger 586 produced by a spring 588 connected between the outer end of the finger 586 and the link. The spring will permit swinging of the finger 586 under pressure in the opposite direction. Thus, the finger 586 normally projects outwardly from the link as indicated in FIGURE 45. Therefore, as indicated diagrammatically in FIGURE 45, if the latch 360 is swung outwardly by reason of an article being positioned on the chuck and the table 316, which supports the spindle assemblies 105, moves clockwise in the direction of the arrow in FIGURE 45, the latch lever 360 will not engage the outer end of the finger 586. However, if the latch lever 360 is swung inwardly by reason of the lack of an article on the chuck, it will engage the contact finger 586 and, therefore, move the link 580 to the left, as indicated in FIGURE 45, but the finger will yield to permit passage of the latch.

The link 580 actuates a rocker arm 590 to which its opposite end is pivoted, as indicated at 591. The inner end of this rocker arm is keyed to a rocking shaft 592 which is rotatably mounted in a sleeve 593 that is carried by a bracket 594 bolted to the upper surface of the table 516. The sleeve 593 partially supports an arcuate strip 595 (FIGURES 43 and 44) which carries a plate 596 thereabove, these members being bolted together by means of the bolts 597. An additional sleeve or post 593a (FIGURE 38) also supports the arcuate strip 595. The upper end of the shaft 592 has keyed thereto a rocker arm 598. The inner end of this rocker arm 598 is pivoted at 599 to a link 600. This link 600 is slidably connected by a pin and slot connection 601 to a plate 602 which extends radially outwardly from the arcuate strip 595 and is bolted thereto by the bolts 603. The link 600 also has a cutout or notch 600a. A tension spring 604 is connected to the plate 602 and to the inner end of the link 600. This spring tends to swing the arm 598 counterclockwise and the arm 590 counterclockwise so that the link 580 is pulled to the right as shown in FIGURE 45 and the link 600 is pulled to the left to the full lines position shown in FIGURE 44 where the notch 600a is beneath the stop pin 569 carried by the squeegee-supporting arm 555.

Therefore, if an article is in position on the article-supporting chuck which is under the cooperating screen S, the stop pin 569 can move downwardly through the opening 600a of the link 600. However, if an article is not in position on the chuck, the latch 360 will engage the finger 586, upon rotation of the table 316, and will exert a pull on the link 580 to pull the link 600 inwardly so that the opening 600a will be inwardly of the stop pin 569 and the stop end 605 will be in the downward path of the stop pin 569, as indicated by the broken lines in FIGURE 44, so as not to permit downward swinging movement of the outer end of the squeegee-supporting arm 555. However, if there is an article on the chuck, the latch 360 will miss the finger 586 and the spring 604 will keep the end 605 of the link 600 beneath the stop pin 569. Thus, the squeegee 577 of each screen and squeegee assembly will only contact with its associated screen S when the article chuck beneath that screen has an article in position thereon to be decorated. This will prevent the squeegee from wiping over the screen when there is no article beneath the screen.

In FIGURES 47 to 50, we have illustrated a different type of spindle and chuck arrangement which is indicated generally by the numeral 105a. Only the outer section 331c of the spindle assembly is different and the difference is mainly in the chuck itself. In this instance, the article is carried on the chuck only by the inner member 350c and the outer portion of the article is not supported by means within the article. The member 350c is attached to the outer end of the squeegee latch control stem 358c and this actuates the latching lever 360c as before. When an article is positioned on the member 350c, it is sealed thereon by means of a sealing ring 354c carried by the member 350c. A spring 610 surrounding the stem 358c normally keeps the member 350c outwardly. Vacuum in the chamber 366c will overcome the spring and pull the member 350c inwardly to actuate the latch lever 360c.

Different registering means is also provided in this instance. For this purpose, each of the screen frames 546c is provided with a registering rack 331d. This rack is carried on the frame 546c by means of upwardly yieldable plunger units 331e. Each rack 331d meshes with a registering gear 342c when the chuck assembly is raised about the pivot 332c by means of the roller 430c and the cam 431c. This gear 342c is carried by the portion 343c of the spindle assembly. Thus, registration will be effected by a gear that rotates with the article supported on the chuck assembly which engages a rack on the screen frame rather than the plunger arrangement 331b previously described. This gear and rack structure also will be used for driving the article as the screen is oscillated and will be substituted for the gear and rack structure disclosed in FIGURES 26, 27 and 27a and including the gears 337 on the spindle assemblies and the associated rack bars 416 and 417.

Figure 49:
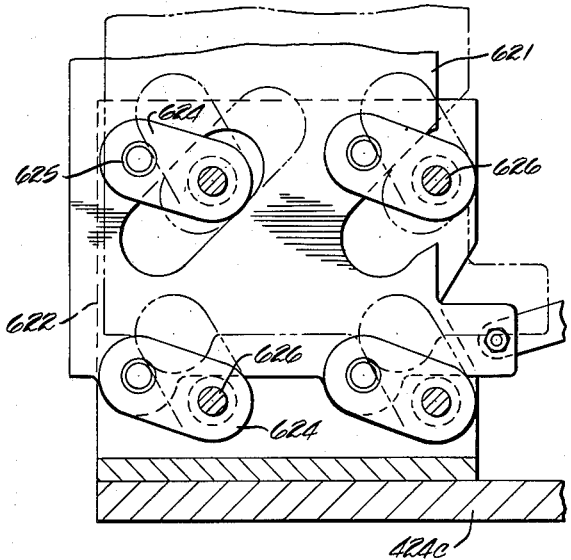
FIGURE 49 is a vertical sectional view taken along line 49—49 of FIGURE 48.
Figure 50:
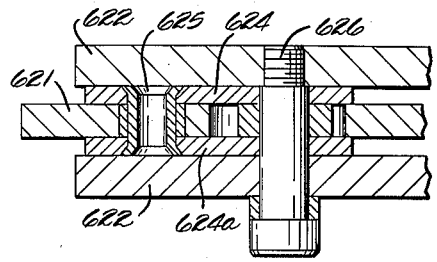
FIGURE 50 is a sectional view taken along line 50—50 of FIGURE 47.

Since with the chuck structure shown in FIGURE 47 the article is supported at its inner end only, it is desirable to provide additional structure for supporting the article during the time it contacts with the screen S. Therefore, we provide the cradle structure illustrated in FIGURES 47 to 50, inclusive. This cradle structure is supported at the decorating station and one of the structures is provided at each decorating station. It is supported by an arm extension 424c which extends radially from the table 310. The cradle is in the form of a pair of rollers 615 which are carried on laterally spaced radially extending axes by an upstanding arm 616 that is carried for vertical adjustment on an upstanding bracket 617 by means of a pin and slot connection 618. The bracket 617 angles inwardly and is bolted by bolts 619 to a supporting plate 620. The plate 620 is carried at the upper edge of an upstanding radially disposed plate 621. The plate 621 is a guide plate which is disposed within a radial guide formed by the upstanding radially extending plates 622 which are disposed in radially extending parallel relationship. The lower edges of these plates 622 are bolted by bolts 623 to the arm extension 424c. The plate 621 is connected to the plate 622 by a series of pivoted links 624, four of these links being shown. Each link 624 is composed of bars 624a on opposite sides of the plate 621, each bar being between a plate 622 and the plate 621. The link is pivoted by a pivot bushing 625 to the center plate 621 and the opposite end of the link is pivoted by a pin 626 to the plates 622 in which the pin is mounted. As shown in FIGURES 47 and 49, the links 624 are normally angled inwardly and downwardly. However, if an inward pull is exerted on the plate 621, the plate will swing outwardly and inwardly into article-supporting position. To exert this inward pull, the inner edge of the plate 621 is connected by a link 627 to the reciprocable cam member 436c which is on the outer end of the rod member 439c of the mechanism that controls lifting of the associated track connecting section 431c.

It will be apparent from the above that the machine is so designed that loading and unloading of the articles is facilitated because at these stations they are in upright position. During the successive decorating operations, the surface of the articles are in horizontal position and decorating is thereby facilitated. Also, it will be apparent that the rotary turret of the machine is rotated intermittently by means of a barrel cam which is so designed that the indexing of the article-supporting chucks to different successive stations is obtained with speed and with extreme accuracy and the chucks are firmly held in position at each successive decorating station. The article-supporting chucks are of a simple compact nature and will effectively support the articles for rotation. The chucks are such that they can be quickly changed to chucks of a different nature for receiving other types of articles to be decorated. In addition, in one arrangement of the machine, each article is supported by a cradle support so that it will be held firmly in association with the screen. At each successive decorating station the article-supporting chucks are subjected to mechanism which serves to provide for line-to-line registration of successive color design patterns with absolute accuracy and without distortion of one color pattern by another. Oscillation of all the screens is controlled by the same cam means from a control location which provides for closer registration control. As the article-supporting chucks near the decorating station, they are raised firmly into contact with the decorating screen by the vertically movable portions of the continuous track which serves also to move the article chucks between vertical and horizontal positions. As the article-supporting chucks move into association with the screens, they are rotated for registry and then are positively driven as the screens are oscillated relative thereto. This positive drive and the positive control of the oscillation of the screens provides for definite movement of the surface of the article being decorated at the same linear speed as the surface of the oscillating screen. The decorating screen units are of such a nature that they may be easily and quickly changed to function with straight or tapering hollow articles or may be changed to function with different diameter articles. Thus, the overall design of the machine is such that it will receive the articles and automatically decorate them, and if the decorating is to be in several colors, will accurately register the successive color patterns.

Many advantages of this machine have been discussed above but many others will be apparent.

Having thus described our invention, what we claim is:

1. A decorating machine comprising a rotatable turret, spindles mounted on said turret at angularly spaced intervals and carrying article-supporting chucks, a decorating station disposed in cooperation with the turret, means for rotating the turret to bring articles carried by said spindles successively to the decorating station, said spindles including sections which are pivoted for vertical swinging movement and which carry said chucks so that articles carried thereby can be moved between a vertical position and a horizontal position, and a continuous cam track extending around said turret and relative to which the turret rotates and cooperating with said spindle sections to move them between a vertical position and a horizontal position with the section in horizontal position at said decorating station.

2. A decorating machine according to claim 1 in which said decorating station includes a decorating screen beneath which the spindle-supported articles successively move, said cam track at said decorating station having a vertically movable section, and means for moving said section upwardly so that the article positioned beneath said screen will be lifted firmly thereagainst.

3. A decorating machine according to claim 2 in which said last-named means embodies cam mechanism operated in timed relationship to movement of said turret.

4. A decorating machine according to claim 3 in which said means for rotating the turret includes a barrel cam for intermittently driving said turret to index it relative to the decorating and other stations, said barrel cam having a cam groove therein, and rollers on said turret for cooperating with said cam groove in the indexing operation.

5. A decorating machine according to claim 4 including means for adjusting said cam to maintain a tight engagement of the rollers therewith.

6. A decorating machine according to claim 3 including a vertically movable cradle for engaging and supporting the article to be decorated and located at said decorating station beneath the screen, and means for moving said cradle upwardly to support the article at said decorating station.

7. A decorating machine according to claim 6 in which said last-named means is also operated by said cam mechanism for lifting said track section.

8. A decorating machine according to claim 2 including means for oscillating said screen as the turret rotates, said spindles being rotatable about their axes, and means for rotating each successive spindle about its axis when the article supported thereby engages the screen, said means rotating the successive spindles in opposite directions so that the articles supported thereby will roll across the screen as it oscillates in opposite directions.

9. A decorating machine according to claim 8 in which said spindle-rotating means comprises a gear carried by the spindle, and fixed rack bars which engage the gears of successive spindles at diametrically opposed points.

10. A decorating machine according to claim 8 in which each of said screens is supported by a support for pivotal movement and for radial movement relative to said turret, and means for guiding the screen during its oscillating movement.

11. A decorating machine according to claim 10 including a vertically movable squeegee mounted over said screen, each of said chucks including a movable member engaged by an article positioned thereon, and latch mechanism actuated by said member of the chuck positioned beneath the screen to permit downward movement of the squeegee into engagement with the screen only when an article is on said chuck.

12. A decorating machine comprising a rotatable turret, spindles mounted on said turret at angularly spaced intervals and carrying article-supporting chucks, a plurality of decorating stations disposed in cooperation with the turret at fixed angularly spaced intervals about the axis of the turret, means for rotating the turret to bring articles carried by said spindles successively to the successive decorating stations, said spindles including sections which are pivoted for vertical swinging movement and which carry said chucks so that articles carried thereby can be moved between a vertical and a horizontal position, and a continuous cam track extending around said turret and cooperating with said spindle sections to move them between horizontal and vertical positions as the turret is rotated with the sections in horizontal position at said decorating stations.

13. A decorating machine according to claim 12 in which each of said decorating stations includes a decorating screen beneath which the spindle-supported articles successively move, said cam track at each of said decorating stations having a vertically movable section, and means for moving each section upwardly so that the article positioned beneath said screen will be lifted firmly thereagainst.

14. A decorating machine according to claim 13 in which said last-named means embodies cam mechanism operated in timed relationship to rotation of said turret.

15. A decorating machine according to claim 14 in which said cam mechanism includes a rotatable cam at each station, and means for driving all of said cams simultaneously.

16. A decorating machine according to claim 15 in which said means for rotating the turret includes a barrel cam for intermittently driving said turret to index it relative to the decorating and other stations, said barrel cam having a cam groove therein, and rollers on said turret for cooperating with said cam groove in the indexing operation.

17. A decorating machine according to claim 16 including means for adjusting said barrel cam to maintain a tight engagement of the rollers therewith.

18. A decorating machine according to claim 14 including a vertically movable cradle for engaging and supporting each article to be decorated and one of which is located below each of said decorating stations beneath the screen at that station, and means for moving said cradle upwardly to support the article at said decorating station.

19. A decorating machine according to claim 18 in which said last-named means is also operated by said cam mechanism which controls upward movement of said track sections.

20. A decorating machine according to claim 13 including means for oscillating each screen at each decorating station as the turret rotates, said spindles being mounted on the turret for rotation about their own axes, and means at each decorating station for rotating each successive spindle about its axis when the article supported thereby engages a screen, said means rotating the successive spindles in opposite directions so that the articles supported thereby will roll across the screen as it oscillates in opposite directions.

21. A decorating machine according to claim 20 in which said spindle rotating means comprises a gear carried by each spindle, and a pair of rack bars fixed relative to the rotation of said turret and located at each of said decorating stations which engage the gears of successive spindles at diametrically opposed points.

22. A decorating machine according to claim 21 in which article-registering means is provided for registering successive articles at successive screens of the decorating stations, said means including a stop cooperating with each spindle for limiting rotation to a registering position, a slip clutch incorporated in said spindle, and means for driving said clutch.

23. A decorating machine according to claim 22 in which said last-named means comprises a gear oscillated in timed relationship to movement of said turret.

24. A decorating machine according to claim 20 in which each of said screens is supported by a support for pivotal movement and radial movement relative to said turret, and means for guiding the screen during its oscillating movement.

25. A decorating machine according to claim 24 including a vertically movable squeegee mounted over each of said screens, each of said chucks including a movable member engaged by an article positioned thereon, and latch mechanism actuated by said member of the chuck positioned beneath a screen to permit downward movement of the squeegee into engagement with such screen only when an article is on said chuck.

26. A decorating machine for surface decorating articles such as hollow glass articles comprising a rotatable turret, spindles mounted on said turret at angularly spaced intervals, each of said spindles comprising an inner section extending radially of the turret and an outer chuck-carrying section pivoted thereto for movement between a dependent vertical position and a horizontal position in axial alignment with said inner section, decorating stations of the screen and squeegee type located at fixed angular positions about the turret, means for intermittently rotating the turret to bring articles carried by said spindle chucks to the successive decorating stations, and a continuous cam track extending around the turret and relative to which the turret rotates, and rollers carried by each of said spindle sections for engaging said cam to move successively the article carried on the article-supporting chuck thereof from a dependent article-receiving position to a substantially horizontal position for cooperation with each successive screen and then to a dependent article-discharge position after leaving the last screen.

27. A decorating machine comprising a rotatable turret, spindles mounted on said turret at angularly spaced intervals and carrying article-supporting chucks, a plurality of decorating stations disposed in cooperation with the turret at fixed angularly spaced intervals about the axis of the turret, means for rotating the turret to bring articles carried by said spindles successively to the successive decorating stations, said spindles having the chucks supported thereon for vertical swinging movement so that the articles carried thereby can be moved between a vertical and a horizontal position for successive cooperation with each of said decorating stations, each of said decorating stations including a screen beneath which the chuck-supported articles successively move and an associated squeegee movable relative to the screen, means for moving each successive chuck upwardly into association with each screen of the successive decorating stations, said means including cam mechanism operated in timed relationship to rotation of said turret.

28. A decorating machine according to claim 27 in which said cam mechanism includes a rotatable cam at each station, and means for driving all of said cams simultaneously.

29. A decorating machine according to claim 28 in which said means for rotating the turret includes a barrel cam for intermittently driving said turret to index it relative to the decorating and other stations, said barrel cam having a cam groove therein, and rollers on said turret for cooperating with said cam groove in the indexing operation.

30. A decorating machine according to claim 29 including means for adjusting said barrel cam to maintain a tight engagement of the rollers therewith.

31. A decorating machine according to claim 27 including a vertically movable cradle for engaging and supporting each article to be decorated and one of which is located below each of said decorating stations beneath the screen at that station, and means for moving said cradle upwardly to support the article at said decorating station.

32. A decorating machine according to claim 31 in which said last-named means is also operated by said cam mechanism which controls upward movement of said chucks.

33. A decorating machine according to claim 27 including means for oscillating each screen at each decorating station as the turret rotates, said spindles being mounted on the turret for rotation about their own axes, and means at each decorating station for rotating each successive spindle about its axis when the article supported thereby engages a screen, said means rotating the successive spindles in oppoite directions so that the articles supported thereby will roll across the screen as it oscillates in opposite directions.

34. A decorating machine according to claim 33 in which said spindle rotating means comprises a gear carried by each spindle, and a pair of rack bars fixed relative to the rotation of said turret and located at each of said decorating stations which engage the gears of successive spindles at diametrically opposed points.

35. A decorating machine according to claim 34 in which article-registering means is provided for registering successive articles at successive screens of the decorating stations, said means including a stop cooperating with each spindle for limiting rotation to a registering position, a slip clutch incorporated in said spindle, and means for driving said clutch.

36. A decorating machine according to claim 35 in which said last-named means comprises a gear oscillated in timed relationship to movement of said turret.

37. A decorating machine according to claim 33 in which each of said screens is supported by a support for pivotal movement and radial movement relative to said turret, and means for guiding the screen during its oscillating movement.

38. A decorating machine according to claim 37 including a vertically movable squeegee mounted over each of said screens, each of said chucks including a movable member engaged by an article positioned thereon, and latch mechanism actuated by said member of the chuck positioned beneath a screen to permit downward movement of the squeegee into engagement with such screen only when an article is on said chuck.

39. A decorating machine according to claim 33 including means for supporting the squeegees for oscillation over their associated screens, means connected to said supporting means for oscillating the squeegees and yieldable means connected to said supporting means for resisting oscillating movement thereof.

40. A decorating machine according to claim 27 including a transfer unit cooperating with said turret for loading the undecorated articles on the spindles and for removing them therefrom, said unit comprising a turret carrying angularly spaced article supports for supporting the articles in vertical position, means for intermittently driving the transfer turret in timed relationship to the rotation of the spindle-carrying turret so that the article supports will position articles in association with successive chucks when they are in vertical position at a loading station for loading onto said chucks and other article supports will receive the decorated articles from the chucks when they are in vertical position at an unloading station, and means for moving each of said article supports vertically relative to the associated chuck at said loading and unloading stations.

41. A decorating machine according to claim 40 in which said last-named means includes a rotatable cam actuated by said intermittent driving means.

42. A machine comprising a rotatable turret, means for intermittently driving said turret, said means comprising a barrel cam having a cam groove, rollers on said turret at angularly spaced intervals for cooperation with said cam groove, said cam including a pair of plates disposed in face-to-face contact and having portions of the cam track formed thereon, springs between the plates tending to separate them, and adjustable members connected between the plates to limit the separation thereof.

References Cited in the file of this patent

UNITED STATES PATENTS

| 2,183,223 | Mankin et al. | Dec. 12, 1939 |
| 2,425,928 | Emerson | Aug. 19, 1947 |
| 2,427,712 | Casler et al. | Sept. 23, 1947 |
| 2,484,671 | Bauman | Oct. 11, 1949 |
| 2,739,531 | Hagerman | Mar. 27, 1956 |
| 2,822,911 | Kummer et al. | Feb. 11, 1958 |
| 2,885,957 | Hansen | May 12, 1959 |
| 2,915,201 | Calehuff et al. | Dec. 1, 1959 |